(12) United States Patent
Takatsuka et al.

(10) Patent No.: US 12,087,033 B2
(45) Date of Patent: Sep. 10, 2024

(54) INFORMATION PROCESSING SYSTEM, INFORMATION PROCESSING METHOD, IMAGE-CAPTURING APPARATUS, AND INFORMATION PROCESSING APPARATUS

(71) Applicant: Sony Group Corporation, Tokyo (JP)

(72) Inventors: Susumu Takatsuka, Tokyo (JP); Hiroki Tetsukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 135 days.

(21) Appl. No.: 17/769,757

(22) PCT Filed: Sep. 14, 2020

(86) PCT No.: PCT/JP2020/034689
§ 371 (c)(1),
(2) Date: Apr. 18, 2022

(87) PCT Pub. No.: WO2021/084944
PCT Pub. Date: May 6, 2021

(65) Prior Publication Data
US 2022/0375197 A1    Nov. 24, 2022

(30) Foreign Application Priority Data

Oct. 30, 2019 (JP) .................................. 2019-197084

(51) Int. Cl.
*G06V 10/74* (2022.01)
*G06V 10/147* (2022.01)
(Continued)

(52) U.S. Cl.
CPC .......... *G06V 10/761* (2022.01); *G06V 10/147* (2022.01); *G06V 10/40* (2022.01);
(Continued)

(58) Field of Classification Search
CPC .... G06V 10/761; G06V 10/147; G06V 10/40; G06V 10/98; G06V 20/52;
(Continued)

(56) References Cited

U.S. PATENT DOCUMENTS

2010/0226495 A1    9/2010  Kelly
2018/0096209 A1*   4/2018  Matsuda .............. G06V 40/103
(Continued)

FOREIGN PATENT DOCUMENTS

GB    2455837 A    6/2009
GB    2473078 A    3/2011
(Continued)

OTHER PUBLICATIONS

International Search Report and Written Opinion mailed on Nov. 17, 2020, received for PCT Application PCT/JP2020/034689, Filed on Sep. 14, 2020, 9 pages including English Translation.

*Primary Examiner* — Hung Q Dang
*Assistant Examiner* — Stephen R Smith
(74) *Attorney, Agent, or Firm* — XSENSUS LLP

(57) ABSTRACT

An information processing system includes an image-capturing apparatus and an information processing apparatus, the image-capturing apparatus including an image-capturing section that is used to obtain a captured image of a subject, and a feature detector that detects, on the basis of the captured image, feature information that is information indicating a feature of the subject, the image-capturing apparatus or the information processing apparatus including a determination section that determines whether there exists a target subject in the captured image on the basis of detected feature information that is the feature information detected by the feature detector, and on the basis of target feature information that is the feature information to be targeted, the target subject being a subject for which the detected feature
(Continued)

information matches or is similar to the target feature information.

13 Claims, 27 Drawing Sheets

(51) Int. Cl.
    *G06V 10/40*         (2022.01)
    *G06V 10/98*         (2022.01)
    *G06V 20/52*         (2022.01)
    *H04N 23/80*         (2023.01)
    *H04N 7/18*          (2006.01)

(52) U.S. Cl.
    CPC .............. *G06V 10/98* (2022.01); *G06V 20/52* (2022.01); *H04N 23/80* (2023.01); *G06V 2201/07* (2022.01); *H04N 7/181* (2013.01)

(58) Field of Classification Search
    CPC .... G06V 2201/07; G06V 10/25; G06V 10/26; H04N 23/80; H04N 7/181; H04N 21/23418; H04N 5/77; H04N 7/183; H04N 21/23476; H04N 23/611; H04N 7/188; H04N 5/913; H04N 23/60; H04N 21/2223; H04N 21/2347; H04N 23/54
    USPC ........................................................ 348/159
    See application file for complete search history.

(56) References Cited

U.S. PATENT DOCUMENTS

| | | |
|---|---|---|
| 2018/0278894 A1* | 9/2018 | Kanga ................... H04N 7/188 |
| 2019/0104251 A1 | 4/2019 | Otsuki |
| 2020/0128168 A1 | 4/2020 | Ichimaru et al. |
| 2020/0159961 A1* | 5/2020 | Smith .................. G06F 18/213 |

FOREIGN PATENT DOCUMENTS

| | | |
|---|---|---|
| JP | 2005-45705 A | 2/2005 |
| JP | 2006-157426 A | 6/2006 |
| JP | 2013-503374 A | 1/2013 |
| JP | 2018-191230 A | 11/2018 |
| JP | 2019-57880 A | 4/2019 |
| WO | 2016/132769 A1 | 8/2016 |

\* cited by examiner

Still image (Seed frame)　　　Encryption filter (Encryption key)

INFORMATION PROCESSING SYSTEM, INFORMATION PROCESSING METHOD, IMAGE-CAPTURING APPARATUS, AND INFORMATION PROCESSING APPARATUS

CROSS-REFERENCE TO RELATED APPLICATIONS

The present application is based on PCT filing PCT/JP2020/034689, filed Sep. 14, 2020, which claims priority to Japanese Patent Application No. 2019-197084, filed Oct. 30, 2019, the entire contents of each are incorporated herein by reference.

TECHNICAL FIELD

The present technology relates to an information processing system, an information processing method, an image-capturing apparatus, and an information processing apparatus, and in particular to a technical field for a system that determines whether there exists a target subject on the basis of a captured image.

BACKGROUND ART

For example, a system such as a surveillance camera system that displays an image on a specified display apparatus or records the image in the specified display apparatus, is known, the image being captured by a camera that is placed in a target location.

When this type of system is used for the purpose of, for example, surveillance, it is conceivable that a system that detects (determines), by performing an image analysis or the like, whether an image of a target subject has been captured, that is, whether the target subject such as a specific person has appeared on the scene, could be constructed.

Note that Patent Literature 1 indicated below discloses a related existing technology.

CITATION LIST

Patent Literature

Patent Literature 1: Japanese Patent Application Laid-open No. 2019-57880

DISCLOSURE OF INVENTION

Technical Problem

With respect to a specific configuration of the above-described system determining whether there exists a target subject, it is conceivable that the above-described system could include at least one image-capturing apparatus that is placed on the scene, and an information processing apparatus that performs a process that includes analyzing a captured image that is acquired from the image-capturing apparatus and determining whether there exists a target subject.

However, when such a configuration is adopted, a captured image is transmitted from the image-capturing apparatus to the information processing apparatus in order to determine whether there exists a target subject. Consequently, a volume of communication data is likely to be increased. In particular, when a plurality of image-capturing apparatuses is used, this results in further increasing a volume of communication data.

The present technology has been achieved in view of the circumstances described above, and it is an object of the present technology to reduce a volume of communication data necessary for determination performed by a system that determines whether there exists a target subject, on the basis of a captured image.

Solution to Problem

An information processing system according to the present technology is an information processing system that includes an image-capturing apparatus and an information processing apparatus, the image-capturing apparatus including an image-capturing section that is used to obtain a captured image of a subject, and a feature detector that detects, on the basis of the captured image, feature information that is information indicating a feature of the subject.

Further, the image-capturing apparatus or the information processing apparatus includes a determination section that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.

When the image-capturing apparatus includes a function of detecting a feature of a subject, as described above, this results in there being no need to transmit a captured image to the information processing apparatus in order to determine whether there exists a target subject.

In the above-described information processing system according to the present technology, the image-capturing section may include an array sensor that includes a plurality of one-dimensionally or two-dimensionally arranged pixels each including a light-receiving element that receives visible light or non-visible light, and the feature detector may be placed in one package with the array sensor.

Image processing for detecting a feature of a subject can be performed in one package with the array sensor, and this makes it possible to reduce the possibility that a content of image will leak out, compared to when the image processing is performed outside of the sensor package.

In the above-described information processing system according to the present technology, the image-capturing apparatus may include the determination section.

This results in the processing load imposed to determine whether there exists a target subject being distributed to the respective image-capturing apparatuses, and results in there being no need for the information processing apparatus to perform processing of the determination.

In the above-described information processing system according to the present technology, the information processing apparatus may include the determination section.

This results in there being no need for the image-capturing apparatus to perform processing of determining whether there exists a target subject.

In the above-described information processing system according to the present technology, the image-capturing apparatus may include an encryption section that encrypts the captured image, and an image transmission section that performs processing of transmitting the captured image encrypted by the encryption section to the information processing apparatus.

It is conceivable that an image captured when a target subject has appeared could be transmitted to the information processing apparatus upon the appearance of the target subject. The adoption of the configuration in which an encrypted captured image is transmitted to the information processing apparatus makes it possible to prevent a content of image from leaking out upon transmitting an image captured when a target subject has appeared to the information processing apparatus.

In the above-described information processing system according to the present technology, the image-capturing section may include an array sensor that includes a plurality of one-dimensionally or two-dimensionally arranged pixels each including a light-receiving element that receives visible light or non-visible light, and the encryption section may encrypt the captured image on the basis of photoelectric random numbers that are random numbers obtained on the basis of a photoelectric conversion performed by the array sensor.

This results in encryption that makes it more difficult to achieve decryption, compared to when pseudorandom numbers are used.

In the above-described information processing system according to the present technology, the encryption section may perform the encryption with respect to a signal read from the pixel in the array sensor.

The encryption of a signal read from a pixel results in preventing a captured-image signal from being stored in a memory in the form of a plaintext.

In the above-described information processing system according to the present technology, the image-capturing apparatus may include a feature transmission section that performs processing of transmitting the feature information detected by the feature detector to the information processing apparatus.

This makes it possible to cause the information processing apparatus to acquire information that indicates a feature of a subject in a captured image.

In the above-described information processing system according to the present technology, the feature detector may detect the feature information for each feature with a different degree of abstraction of the subject.

Examples of the features with different degrees of abstraction when the subject is a person include a feature with a high degree of abstraction such as height and gender; and a feature with a low degree of abstraction (that is, a more specific feature) such as a color of the clothes and a color of hair. Further, the examples of the features with different degrees of abstraction when the subject is a vehicle include a feature with a high degree of abstraction such as a color of a vehicle, and a vehicle type such as a standard-sized vehicle or a large-sized vehicle; and a feature with a low degree of abstraction such as a specific vehicle model and a specific number in a license plate. For example, depending on an application that uses feature information, there may be no need for information regarding a feature with a low degree of abstraction, but there may be a need for information regarding a feature with a high degree of abstraction only. When feature information is detected for each feature with a different degree of abstraction, as described above, this makes it possible to only select and output information regarding a feature with a specific degree of abstraction from among detected feature information, or to output all of detected feature information regardless of the degree of abstraction.

In the above-described information processing system according to the present technology, the information processing system may include a plurality of the image-capturing apparatuses.

This makes it possible to determine whether there exists a target subject on the basis of captured images from a plurality of viewpoints.

The above-described information processing system according to the present technology may further include a notification processing section that performs processing of outputting notification information in response to the determination section determining that there exists the target subject.

This makes it possible to notify a user of the appearance of a target subject.

The above-described information processing system according to the present technology may include a plurality of the image-capturing apparatuses, and the information processing apparatus may include an anomaly-detection determination section that determines, on the basis of a result of the determination performed by the determination section, whether the target subject has been detected in captured images at respective timings that are not physically probable, the captured images being captured by the image-capturing apparatuses being different from each other.

"Being detected at a timing that is not physically probable" refers to a state in which, when a target subject has been detected in images respectively captured by two image-capturing apparatuses, a time difference in target-subject detection between the two image-capturing apparatuses is smaller than a shortest time necessary for an object corresponding to the target subject to move between locations at which the two image-capturing apparatuses are respectively placed. When a target subject has been detected by different image-capturing apparatuses at respective timings that are not physically probable, it can be estimated that there is a problem with the accuracy in detecting a target subject, or it can be estimated that an anomaly due to an algorithm used to detect a target subject, or an anomaly due to an object corresponding to a target subject has occurred, such as a state in which a counterfeit of an object corresponding to a target subject has been coming onto the market.

An information processing method according to the present technology is an information processing method that is performed by an information processing system that includes an image-capturing apparatus and an information processing apparatus, the information processing method including detecting, by the image-capturing apparatus, feature information that is information indicating a feature of a subject, on the basis of a captured image of the subject; and determining, by the image-capturing apparatus or the information processing apparatus, whether there exists a target subject in the captured image on the basis of detected feature information that is the feature information obtained by the detection, and on the basis of target feature information that is the feature information to be targeted, the target subject being a subject for which the detected feature information matches or is similar to the target feature information.

Such an information processing method also makes it possible to provide effects similar to those provided by the above-described information processing system according to the present technology.

Further, an image-capturing apparatus according to the present technology includes an image-capturing section that is used to obtain a captured image of a subject; a feature detector that detects, on the basis of the captured image, feature information that is information indicating a feature of the subject; and a determination section that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.

Furthermore, an information processing apparatus according to the present technology includes a determination section that acquires detected feature information from an image-capturing apparatus that includes an image-capturing section that is used to obtain a captured image of a subject, and a feature detector that detects, on the basis of the captured image, feature information that is information indicating a feature of the subject, the detected feature information being the feature information detected by the feature detector, the determination section determining whether there exists a target subject in the captured image on the basis of the acquired detected feature information, and on the basis of target feature information that is the feature information to be targeted, the target subject being a subject for which the detected feature information matches or is similar to the target feature information.

The image-capturing apparatus and the information processing apparatus also make it possible to provide effects similar to those provided by the above-described information processing system according to the present technology.

MODE(S) FOR CARRYING OUT THE INVENTION

Embodiments will be described below in the following order.

<1. Configuration of Information Processing System>
[1-1. Overall Configuration of System]
[1-2. Configuration of Image-Capturing Apparatus]
[1-3. Configuration of Information Processing Apparatus]
<2. Regarding Security Measures>
[2-1. Regarding Random Numbers Used for Encryption]
[2-2. Regarding Encryption-Target Signal]
[2-3. Regarding Tamper Resistance]
[2-4. Procedure of Processing Performed for Image Encryption]
[2-5. Encryption for Each Level]
[2-6. Procedure of Processing Performed for Encryption for Each Level]

<3. Processing Related to Feature Information (Normal Mode)>
<4. Processing Related to Feature Information (Target Search Mode)>
[4-1. First Example]
[4-2. Second Example]
[4-3. Third Example]
<5. Modifications>
<6. Conclusion Regarding Embodiments>
<7. Present Technology>

Figure 1:
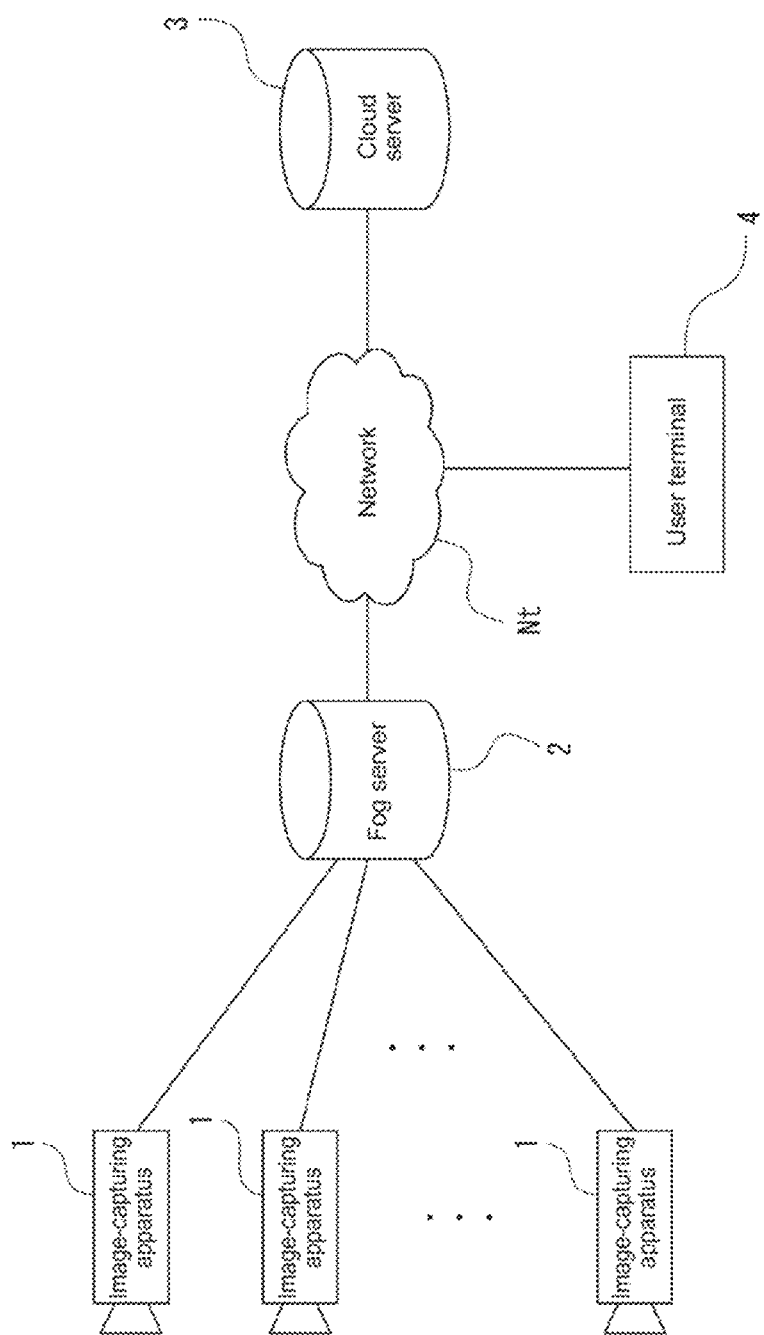
FIG. 1 is a block diagram schematically illustrating an example of a configuration of an information processing system according to embodiments.

1. Configuration of Information Processing System 1-1. Overall Configuration of System FIG. 1 is a block diagram schematically illustrating an example of a configuration of an information processing system 100 according to embodiments of the present technology.

As illustrated in the FIGURE, the information processing system 100 includes at least a plurality of image-capturing apparatuses 1, a fog server 2, a cloud server 3, and a user terminal 4. In this example, the fog server 2, the cloud server 3, and the user terminal 4 can communicate with each other through a network Nt that is, for example, the Internet.

The fog server 2, the cloud server 3, and the user terminal 4 are each configured as an information processing apparatus that includes a microcomputer that includes a central processing section (CPU), a read only memory (ROM), and a random access memory (RAM). Here, the user terminal 4 is an information processing apparatus that is expected to be used by a user who is a recipient of services that are provided using the information processing system 100.

The image-capturing apparatus 1 performs image-capturing using an image sensor to obtain image data (captured-image data) in the form of digital data.

The fog server 2 can perform data communication with each image-capturing apparatus 1. The fog server 2 can receive various pieces of data such as captured-image data from the image-capturing apparatus 1, and can transmit various pieces of data such as instruction data to the image-capturing apparatus 1.

Here, the information processing system 100 illustrated in FIG. 1 can serve as a surveillance camera system that stores (records), in the fog server 2 or the cloud server 3, data of an image captured by the image-capturing apparatus 1, and causes a user to view the recorded data using the user terminal 4.

A surveillance camera system placed in a store is conceivable as an example of the information processing system 100. In this case, each image-capturing apparatus 1 is arranged in a specified location in the store so that a user can confirm, for example, a type of customers coming to the store, and the behavior of a customer (the line of flow of customers) in the store.

Further, it is also conceivable that the information processing system 100 could be used, for example, for the purpose of monitoring an outdoor location such as in a city or for the purpose of monitoring a production line in factory automation (FA).

Note that there are various applications of the image-capturing apparatus 1, and examples of the various applications include a security camera, an in-store camera used to collect customer information, a system used to supervise entrance and exit using a face authentication, a drive recorder, an in-vehicle camera, a traffic monitoring camera, a cash register and a point-of-sale (POS) system in a store, and a robot (such as a robot used in FA).

When the information processing system 100 is applied to a surveillance camera system in a store, the fog server 2 is assumed be placed in a monitoring-target store together with each image-capturing apparatus 1. For example, when there is a plurality of monitoring-target stores, a plurality of image-capturing apparatuses 1 is assumed to be placed for each store. In such a case, when the fog server 2 is provided for each store, this results in there being no need for the cloud server 3 to directly receive pieces of data transmitted by the respective image-capturing apparatuses 1 of a plurality of image-capturing apparatuses 1 placed in each store. This results in a reduction in the processing load of the cloud server 3.

In the information processing system 100 of this example, captured-image data is encrypted when the image-capturing apparatus 1 transmits the captured-image data, in order to enhance the confidentiality of the captured-image data. This will be described later. As described below, the image-capturing apparatus 1 of the present embodiment performs various processes for the above-described encryption of captured-image data.

1-2. Configuration of Image-Capturing Apparatus

Figure 2:
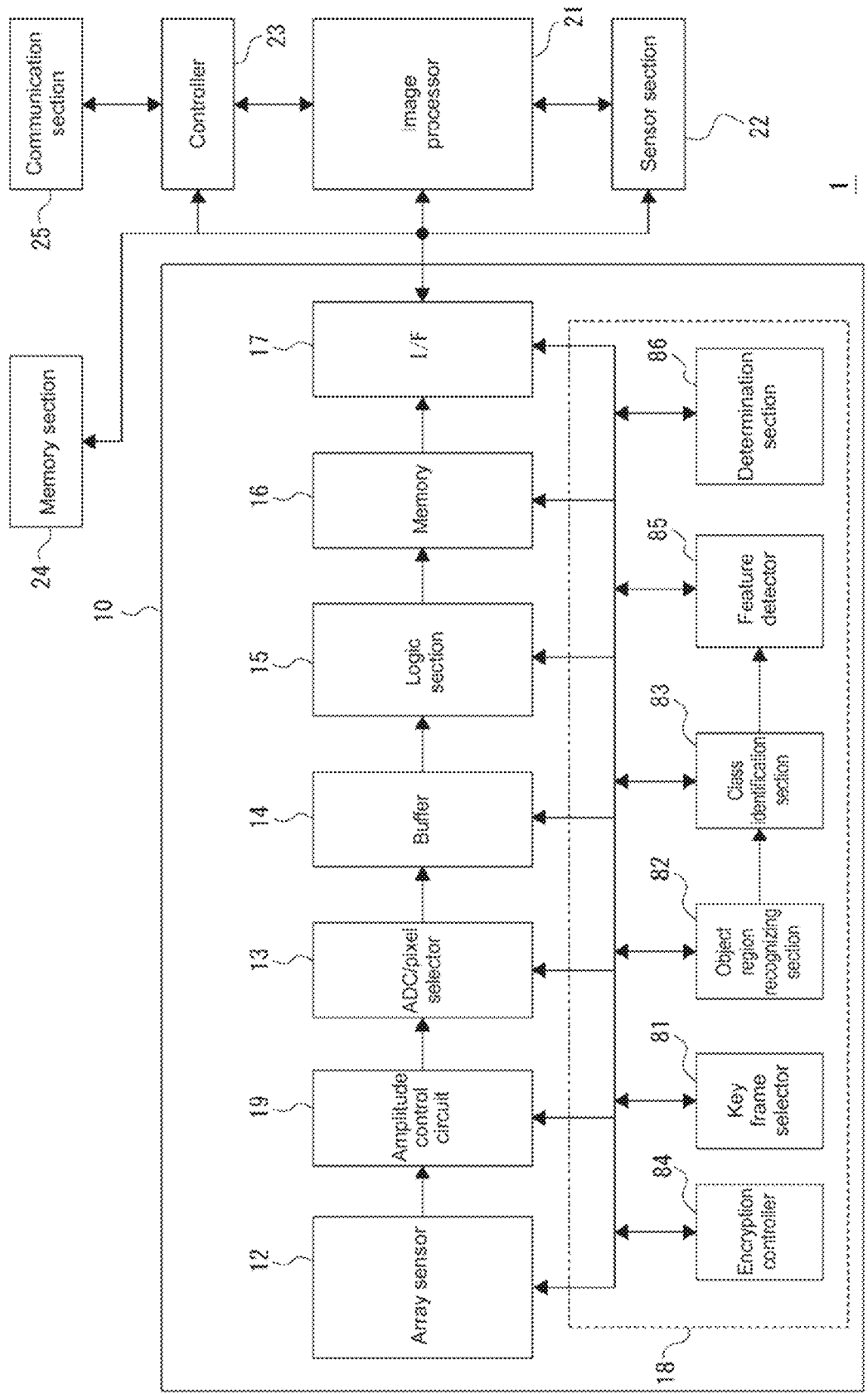
FIG. 2 is a block diagram illustrating an example of a configuration of the inside of an image-capturing apparatus according to the embodiments.

FIG. 2 is a block diagram illustrating an example of a configuration of the inside of the image-capturing apparatus 1.

As illustrated in the FIGURE, the image-capturing apparatus 1 includes an image-capturing sensor section 10, an image processor 21, a sensor section 22, a controller 23, a memory section 24, and a communication section 25.

For each pixel, the image-capturing sensor section 10 receives light that enters through a camera optical system (not illustrated) included in the image-capturing apparatus 1, and performs a photoelectric conversion to obtain captured-image data.

The image-capturing sensor section 10 includes hardware components that are an image sensor device, a memory device such as a dynamic random access memory (DRAM), and a processor, although an illustration thereof is omitted here. Further, the image-capturing sensor section 10 is a device with the integrated components that is obtained by creating a three-layer stack structure of the three components, by creating a single-layer structure to be laid flat, or by creating a two-layer stack structure (for example, the memory device and the processor are in the same layer).

The array sensor 10 of this example includes a function of detecting an object using an image analysis, and is a device that can be called an intelligent array sensor.

As illustrated in the FIGURE, the image-capturing sensor section 10 includes an array sensor 12, an amplitude control circuit 19, an analog-to-digital converter (ADC)/pixel selector 13, a buffer 14, a logic section 15, a memory 16, an interface section 17, and a computing section 18.

The array sensor 12 includes a plurality of one-dimensionally or two-dimensionally arranged pixels each including a light-receiving element that receives visible light or non-visible light. For example, pixels included in a large number of pixels are two-dimensionally arranged in a row direction and in a column direction, and a two-dimensional image signal is output by a photoelectric conversion being performed in the light-receiving element of each pixel.

The amplitude control circuit 19 performs an amplitude control on an electric signal (an analog signal) obtained by a photoelectric conversion being performed by the array sensor 12. In this example, the amplitude control circuit 19 can change an amplification factor on the basis of an instruction given by the computing section 18. This will be described again later.

An electric signal obtained by a photoelectric conversion being performed by the array sensor 12 is input to the ADC/pixel selector 13 through the amplitude control circuit 19. The ADC/pixel selector 13 converts the input electric signal in the form of an analog signal into digital data, and outputs an image signal (image data) in the form of digital data.

Further, the ADC/pixel selector 13 includes a function of performing a pixel selection from the pixels (the light-receiving elements) of the array sensor 12. This makes it possible to only acquire a photoelectric conversion signal of a selected pixel included in the array sensor 12, to convert the acquired signal into digital data, and to output the obtained digital data. In other words, the ADC/pixel selector 13 normally converts a photoelectric conversion signal into digital data and outputs the obtained digital data with respect to all of the valid pixels making up an image of one frame, and can also convert a photoelectric conversion signal into digital data and output the obtained digital data only with respect to a selected pixel.

Image data is acquired by the ADC/pixel selector 13 for each frame. The image data for each frame is temporarily stored in the buffer 14, and is read at an appropriate timing to be used for processing performed by the logic section 15.

The logic section 15 can perform various kinds of necessary signal processing (image processing) on an input image signal for each frame.

For example, the logic section 15 can adjust the image quality by performing color correction, gamma correction, color shading processing, gain processing, and edge enhancement processing. Further, it is conceivable that the logic section 15 could perform processing of changing the data size, such as data compression processing, a resolution conversion, and a frame rate conversion.

With respect to the respective processes performed by the logic section 15, a parameter used to perform each of the processes is set. Examples of the parameter include set values such as a coefficient used to correct for the color or the brightness, a gain value, a compression rate, and a frame rate. The logic section 15 performs a necessary process using a parameter set for the process. In the present embodiment, the parameter may be set by the computing section 18.

The image data on which processing has been performed by the logic section 15 is stored in the memory 16 including, for example, a DRAM.

The image data stored in the memory 16 is transmitted to be output to the image processor 21, the controller 23, and the memory section 24 by the interface section 17 at a timing at which the image data becomes necessary.

The image processor 21 can perform specified image signal processing on the image data transmitted from the image-capturing sensor section 10. The image processor 21 can also refer to detection information obtained by detection being performed by the sensor section 22.

Further, the computing section 18 in the image-capturing sensor section 10 is configured as, for example, an artificial intelligence (AI) processor. Further, as illustrated in the FIGURE, the computing section 18 includes a key frame selector 81, an object region recognizing section 82, a class identification section 83, an encryption controller 84, a feature detector 85, and a determination section 86 that are executable computing functions. Note that a plurality of processors may form these computing functions.

Using a specified algorithm, or in response to an instruction being given, the key frame selector 81 performs processing of selecting a key frame from among frames of image data that corresponds to a moving image.

With respect to a frame of image data that is obtained by a photoelectric conversion being performed by the array sensor 12 and is acquired by the ADC/pixel selector 13, the object region recognizing section 82 performs processing including detecting a region of an object that is a detection candidate and recognizing a region (a bounding box) that surrounds a detection-target object in an image (a frame).

The "detection-target object" herein refers to an object that can be a detection target for the purpose of recognizing an object from an image. The detection-target object differs depending on, for example, the application of the information processing system 100. However, any object may be the detection-target object described above. Examples of the detection-target object include all of the objects such as an animal including a human being, a mobile object (such as an automobile, a bicycle, and an aircraft), a natural object (such as a vegetable, and a plant), an industrial product/component, a building, facilities, a mountain, the sea, a river, a star, the sun, and a cloud, although those are merely a portion of the examples. Any object may correspond to the detection-target object.

Further, the object region recognizing section 82 in this example performs processing of calculating, on the basis of a bounding box, a region of interest (ROI) that is region information that indicates a region to be processed.

The class identification section 83 groups, into classes, objects detected by the object region recognizing section 82.

The class is information that indicates a category of an object, and objects to be detected are classified into, for example, "human being", "automobile", "aircraft", "ship", "truck", "bird", "cat", "dog", "deer", "frog", and "horse".

A parameter selector 84 stores therein a parameter used to perform signal processing according to the class, and selects at least one corresponding parameter using, for example, a class of a detected object that is identified by the class identification section 83, or a bounding box for the detected object. Then, the at least one parameter is set for the logic section 15.

The encryption controller 84 performs control such that an image signal obtained by image-capturing being performed by the array sensor 12 is encrypted. Note that a specific example of processing performed by the encryption controller 84 in order to perform the encryption of an image signal will be described again later.

The feature detector 85 detects feature information that is information that indicates a feature of a subject in a captured image, on the basis of image data that is obtained by a photoelectric conversion being performed by the array sensor 12 and is acquired by the ADC/pixel selector 13.

There are various examples of the feature information detected by the feature detector 85.

Examples of the feature information when the target subject is a person include information regarding a feature such as height, gender, and age; and information regarding a feature related to a motion such as a way of walking. Further, examples of the feature information when the target subject is a vehicle such as an automobile include information regarding, for example, a color, a vehicle type such as a standard-sized vehicle or a large-sized vehicle, a number in a license plate of the vehicle, and the number of occupants of the vehicle.

Furthermore, examples of the feature information when the target subject is a component used in factory automation (FA) include the type of the component; and a component identifier such as a number or a bar code that is printed on the component.

Note that the feature information regarding a motion of a subject, such as the way of walking described above, may be generated as, for example, information obtained by coding a feature of the motion.

The feature detector 85 of this example detects feature information regarding a subject for each feature with a different degree of abstraction of a subject. Specifically, the feature detector 85 of this example detects, as feature information regarding a subject, information regarding a feature with a high degree of abstraction, and information regarding a feature with a low degree of abstraction.

For example, when the target subject is a person, information such as the information regarding height and gender described above is detected as the information regarding a feature with a high degree of abstraction; and information, such as information regarding a color of the clothes and a color of hair, that indicates a more specific feature than the information regarding a feature with a high degree of abstraction, is detected as the information regarding a feature with a low degree of abstraction.

Further, when the target subject is a vehicle, information such as information regarding a color of a vehicle, and a vehicle type such as a standard-sized vehicle or a large-sized vehicle is detected as the information regarding a feature with a high degree of abstraction; and information regarding, for example, a vehicle model and a number in a license plate that are more specific features, is detected as the information regarding a feature with a low degree of abstraction.

Furthermore, when the target subject is a component used in FA, information regarding, for example, the type of the component is detected as the information regarding a feature with a high degree of abstraction, and information regarding, for example, a component identifier such as a number or a bar code that is printed on the component, is detected as the information regarding a feature with a low degree of abstraction.

The feature detector 85 performs the above-described processing of detecting feature information by performing an image analysis on the basis of captured-image data obtained by the ADC/pixel selector 13. In the information processing system 100 of this example, the captured-image data obtained by the ADC/pixel selector 13 is encrypted, which will be described later. Thus, the feature detector 85 performs the above-described processing of detecting feature information while sequentially decrypting pieces of captured-image data obtained by the ADC/pixel selector 13.

On the basis of detected feature information that is feature information detected by the feature detector 85, and target feature information that is feature information to be targeted, the determination section 86 determines there exists a target subject in a captured image, the target subject being a subject for which the detected feature information matches or is similar to the target feature information. Note that the processing performed by the determination section 86 will be described again later.

Here, the above-described processes performed by the various functions in the computing section 18 are processes that are not normally performed in an image sensor. In the present embodiment, an object detection, a class recognition, and controls based on the object detection and the class recognition are performed in an image sensor.

The controller 23 includes, for example, a microcomputer that includes a CPU, a ROM, and a RAM, and performs an overall control on the image-capturing apparatus 1 by the CPU performing various kinds of processing in accordance with a program stored in the ROM or a program loaded into the RAM.

For example, the controller 23 gives an instruction to the image-capturing sensor section 10 to control executions of various kinds of processing such as processing of acquiring captured-image data. Likewise, with respect to the image processor 21, the controller 23 controls executions of various kinds of processing.

Further, the controller 23 controls writing of various pieces of data into the memory section 24 and reading of various pieces of data from the memory section 24. The memory section 24 is, for example, a nonvolatile storage device such as a hard disk drive (HDD) or a flash memory device, and is used as a storing destination (a recording destination) for various pieces of data such as captured-image data obtained by the image-capturing sensor section 10. Furthermore, the controller 23 communicates various pieces of data to an external apparatus through the communication section 25. The communication section 25 of this example can communicate data to the fog server 2 illustrated in FIG. 1.

1-3. Configuration of Information Processing Apparatus

Figure 3:
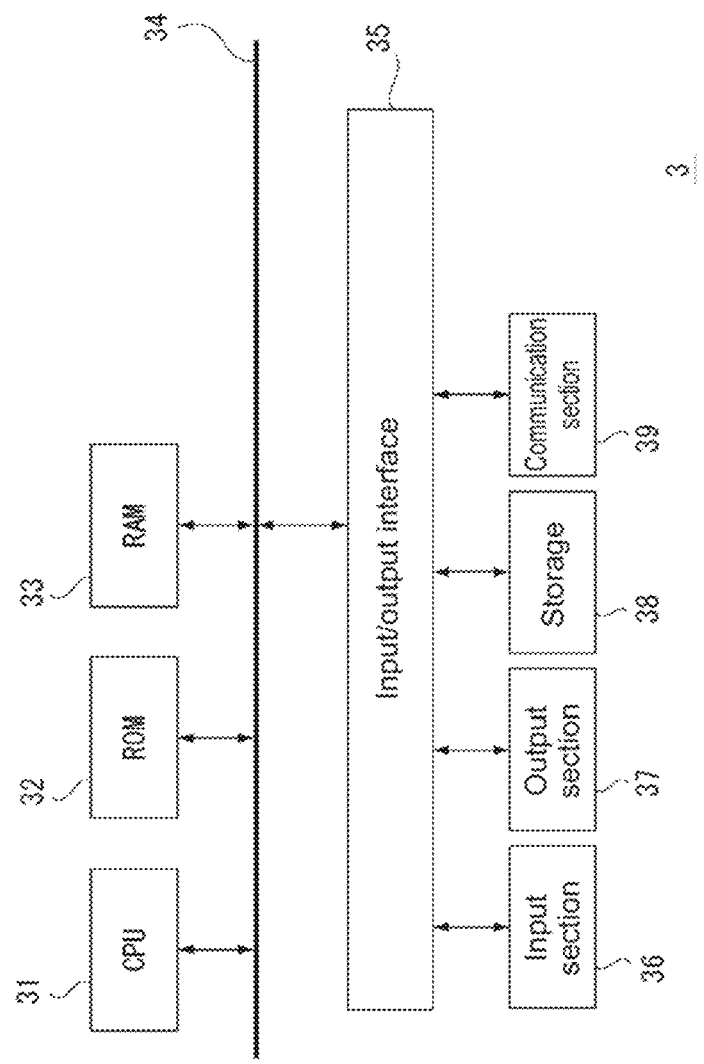
FIG. 3 is a block diagram illustrating an example of a configuration of the inside of an information processing apparatus according to the embodiments.

FIG. 3 is a block diagram illustrating an example of a configuration of the inside of an information processing apparatus that serves as the cloud server 3. Note that the fog server 2 and the user terminal 4 illustrated in FIG. 1 each have a hardware configuration similar to the hardware configuration illustrated in FIG. 3. Thus, the description is not made repeatedly.

As illustrated in the FIGURE, the cloud server 3 includes a CPU 31, a ROM 32, a RAM 33, a bus 34, an input/output interface 35, an input section 36, an output section 37, a storage 38, and a communication section 39.

The CPU 31, the ROM 32, and the RAM 33 are connected to each other through the bus 34. The input/output interface 35 is also connected to the bus 34. The CPU 31 performs various kinds of processing in accordance with a program stored in the ROM 32 or a program loaded into the RAM 33 from the storage 38. Further, data and the like that are necessary for the CPU 31 to perform various kinds of processing are also stored in the RAM 33 as necessary.

The input section 36, the output section 37, the storage 38, and the communication section 39 are connected to the input/output interface 35.

The input section 36 comprehensively represents devices for detecting an operation input, such as a keyboard, a mouse, and a touch panel.

Examples of the output section 37 include a display that includes, for example, a liquid crystal display (LCD) or an organic electroluminescence (EL) panel; and a speaker.

The storage 38 includes, for example, a hard disk drive (HDD) or a flash memory device.

The communication section 39 performs communication processing and communication between apparatuses through the network Nt.

2. Regarding Security Measures

2-1. Regarding Random Numbers Used for Encryption

The image-capturing apparatus 1 of the present embodiment encrypts captured-image data, and, in this example, photoelectric random numbers are used for the encryption. In other words, an encryption key used to encrypt captured-image data is generated on the basis of photoelectric random numbers.

Here, the photoelectric random numbers refer to random numbers obtained on the basis of a photoelectric conversion performed by the array sensor 12. Specifically, in this example, values of electric signals for respective pixels that are obtained by a photoelectric conversion being performed by the array sensor 12 are acquired as photoelectric random numbers, and an encryption key is generated.

Figure 4:
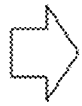
FIG. 4 illustrates an example of a method for generating an encryption filter (an encryption key) on the basis of photoelectric random numbers.

FIG. 4 illustrates an example of a method for generating an encryption filter (an encryption key) with respect to image data on the basis of photoelectric random numbers.

First, the FIGURE illustrates, on the left, values of electric signals for respective pixels that are obtained by a photoelectric conversion being performed by the array sensor 12. In this example, values of respective pixels (brightness values) of an image (a still image) obtained by image-capturing being performed by the array sensor 12 are used as the photoelectric random numbers.

Here, in the following description, a frame image captured in order to obtain photoelectric random numbers, that is, a frame image from which photoelectric random numbers are generated is referred to as a "seed frame".

In this example, the above-described values of electrical signals for respective pixels are not used as photoelectric random numbers with no change, but, as illustrated on the right in the FIGURE, at least a portion of the values of the electrical signals for the respective pixels are assigned to pixel positions that are different from pixel positions at which the assigned values are actually obtained, and photoelectric random numbers are generated. In other words, pixels positions for the values of the electrical signals for the respective pixels are shuffled to generate photoelectric random numbers. Further, in this example, the photoelectric random numbers generated as described above are used as an encryption key (an encryption filter) with respect to captured-image data.

When pixel positions are shuffled to generate photoelectric random numbers, as described above, this makes it more difficult to decrypt an encryption key, and thus makes it possible to enhance the security, compared to when photoelectric random numbers obtained by assigning values of electric signals for respective pixels to pixel positions at which the values of the electric signals are actually obtained, are used with no change.

Here, values of electric signals for respective pixels may be modulated using a specified algorithm to be used to generate an encryption key. For example, a value obtained by multiplying a value of an electric signal for each pixel by a specified coefficient may be assigned to the pixel to obtain photoelectric random numbers. Alternatively, when values of electric signals for respective pixels include a value with a decimal place, the value with a decimal place may be rounded to an integer to obtain photoelectric random numbers.

Note that pixel positions do not necessarily have to be shuffled to generate an encryption key, as described above, and values of electric signals for respective pixels may be used as an encryption key with no change.

Here, pseudorandom numbers generated by software are conventionally often used as random numbers used for encryption. However, pseudorandom numbers are generated using an algorithm that calculates a numerical value, and true random numbers are not generated. Thus, an encryption key may be decrypted to be replicated.

On the other hand, the photoelectric random numbers described above can be true random numbers, and it is possible to make it more difficult to decrypt an encryption key by generating the encryption key on the basis of the photoelectric random numbers.

2-2. Regarding Encryption-Target Signal

The following is a conventional method for encrypting an image signal obtained by image-capturing being performed by the array sensor 12. In general, the image signal read from the array sensor 12 is once stored in a memory in the form of a plaintext, and the stored image signal is encrypted.

However, the adoption of such an encryption method enables hacking that includes intentionally causing an error at the timing of encryption using, for example, malware, outputting a content of memory in the form of a dump file, and copying a plaintext stored in the memory.

Thus, in the present embodiment, a signal read from a pixel of the array sensor 12 is encrypted to prevent an image signal from being stored in a memory in the form of a plaintext.

Specifically, in this example, the amplitude control circuit 19 illustrated in FIG. 2 performs an amplitude control on a signal read from a pixel of the array sensor 12, using a coefficient depending on the encryption key (encryption filter) illustrated in FIG. 4, and this results in encrypting the read signal.

Figure 5:
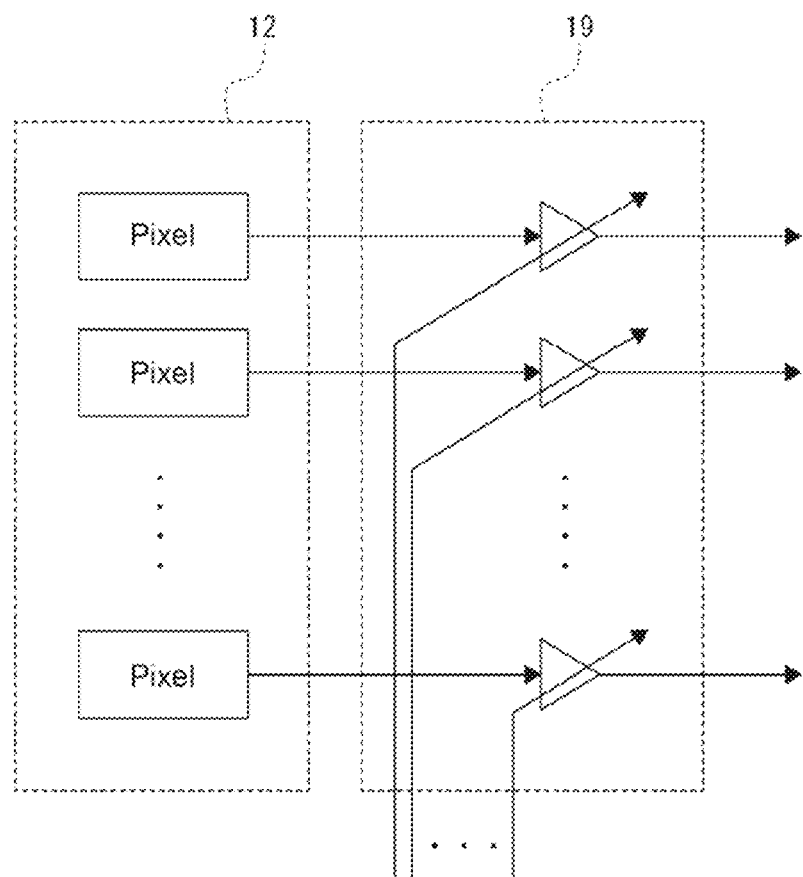
FIG. 5 illustrates a notion of an encryption of a read signal that is performed by an amplitude control circuit according to the embodiments.

FIG. 5 illustrates a notion of an encryption of a read signal that is performed by the amplitude control circuit 19.

As illustrated in the FIGURE, a value of a signal (in this case, a charge signal) read from each pixel in the array sensor 12 is multiplied by a coefficient depending on an encryption key using an amplifier that is included in the amplitude control circuit 19. In the image-capturing apparatus 1 illustrated in FIG. 2, an amplitude control is performed on a read signal for each pixel in the form of an analog signal, as described above, and then image data is temporarily stored (recorded) in the memory 16 through the buffer 14 and the logic section 15.

The encryption controller 84 sets, for the amplifier described above, a coefficient depending on an encryption key so that a signal read from each pixel in the array sensor 12 is encrypted.

Note that FIG. 5 is merely a notion diagram, and an amplifier does not necessarily have to be provided for each pixel in the amplitude control circuit 19. For example, one amplifier included in the amplitude control circuit 19 may be shared by the respective pixels when bulk readouts are performed, as in the case of using a charge-coupled device (CCD) image sensor. Note that, in this case, an amplitude control for each pixel is performed by time division.

The example of encrypting a read signal in the form of an analog signal has been described above as an example of encrypting a read signal. However, a read signal in the form of a digital signal that is obtained by an A/D conversion being performed may also be encrypted.

Figure 6:
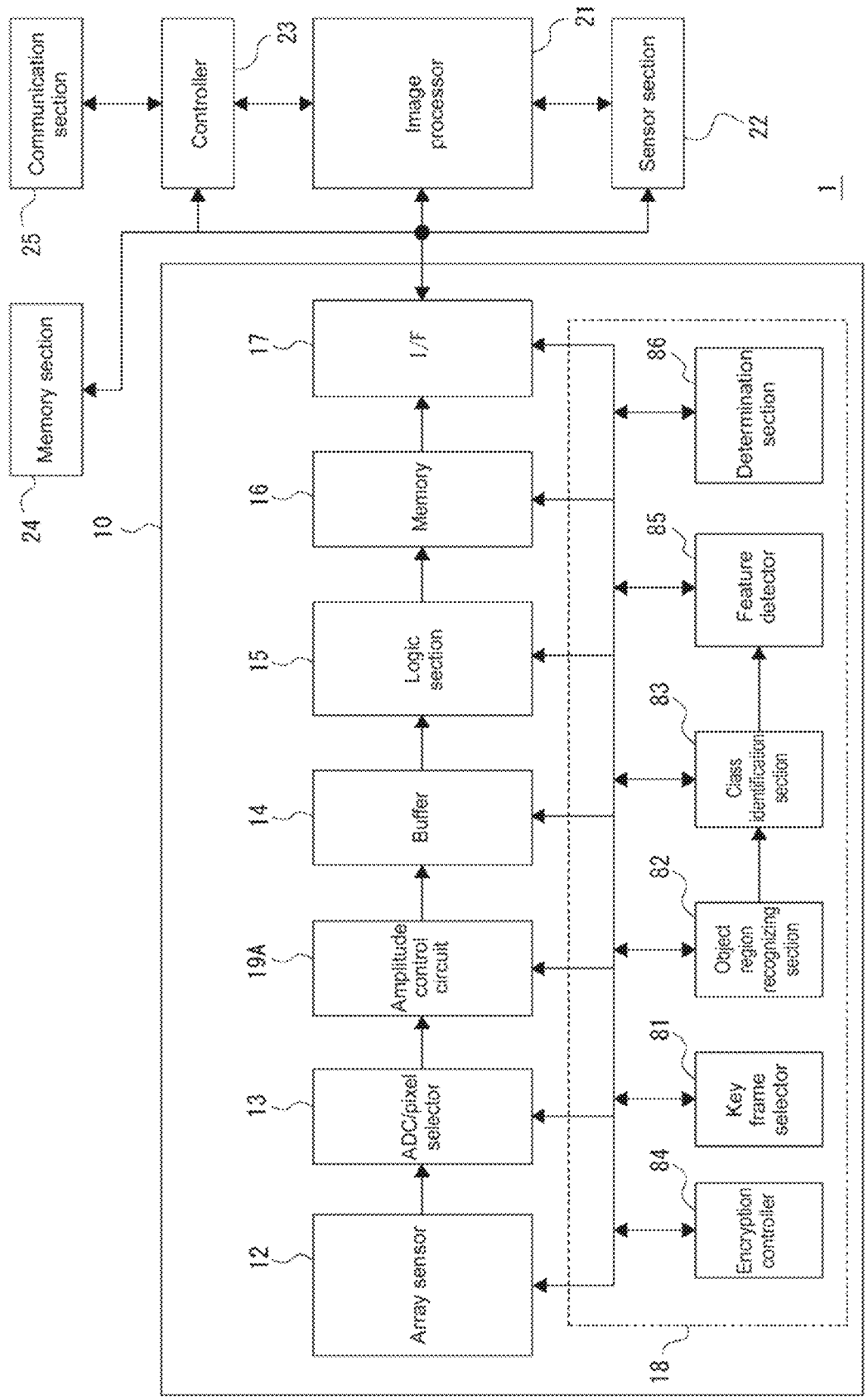
FIG. 6 illustrates an example of a configuration of the image-capturing apparatus when a read signal in the form of a digital signal is encrypted.

FIG. 6 illustrates an example of a configuration of the image-capturing apparatus 1 when a read signal in the form of a digital signal is encrypted.

In the image-capturing apparatus 1 in this case, the image-capturing sensor section 10 includes an amplitude control circuit 19A instead of the amplitude control circuit 19, the amplitude control circuit 19A performing an amplitude control on a read signal that is converted into a digital signal by the ADC/pixel selector 13.

Note that the processing performed by the encryption controller 84 in this case is similar to the processing performed by the encryption controller 84 of FIG. 2 except that a target for which a coefficient for each pixel depending on an encryption key is set is the amplitude control circuit 19A instead of the amplitude control circuit 19. Thus, the description is not made repeatedly.

Here, if an analog read signal is encrypted as described above, it will be very difficult to fraudulently acquire an analog signal from outside. This results in enhancing the security.

Note that, when an analog read signal is encrypted, this may result in a reduction in the reproducibility of an image obtained by decrypting an encrypted image.

However, when, for example, a target image is used to analyze a feature, an attribute, and the behavior of a target such as a person, it is sufficient if a detection and an analysis of the target can be sufficiently performed with the degree of reproducibility of the image. Thus, there seems to be no practical issue.

On the other hand, when a digital read signal is encrypted, the accuracy in encryption processing is improved. This results in being able to improve the reproducibility of the image.

Note that the above-described encryption of a read signal is a type of encryption using stream ciphering. The stream ciphering is ciphering used to encrypt a plaintext for each piece of specified data, that is, for example, for each bit or for each byte.

In the stream ciphering, it is not necessary that encryption-target signals have equal data lengths, and thus there is no need for preprocessing performed before a target signal is encrypted. Thus, the adoption of the stream ciphering makes it possible to speed up the encryption processing.

Note that encrypted captured-image data also ends up being obtained when an analog read signal is encrypted. From this point of view, it is assumed that, herein, the encrypting an analog signal is included in encrypting captured-image data.

2-3. Regarding Tamper Resistance

Figure 7:
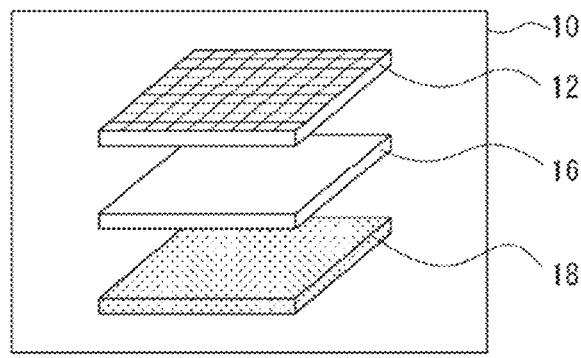
FIG. 7 illustrates an example of a configuration of an image-capturing sensor section according to the embodiments.

As illustrated in FIG. 7, respective chips of the array sensor 12, the memory 16, and the computing section 18 of the image-capturing sensor section 10 of this example are packaged in order to obtain tamper-resistance hardware. In other words, the respective chips are formed in a single semiconductor package.

In the example of FIG. 7, the chip of the memory 16 is stacked on the chip of the computing section 18, and, further, the chip of the array sensor 12 is stacked on the chip of the memory 16.

In this example, an encryption section that encrypts a read signal is formed in, for example, the chip of the array sensor 12.

Further, the encryption controller 84 generating an encryption key on the basis of photoelectric random numbers and causing the encryption section described above to perform encryption on the basis of the encryption key, is included in the chip of the computing section 18.

In this example, the respective chips are electrically connected by performing a Cu—Cu connection used to connect pads made of Cu (copper). Thus, the electrically connected portions will be broken if the image-capturing sensor section 10 is disassembled. In other words, this results in obtaining tamper-resistance hardware.

Figure 8:
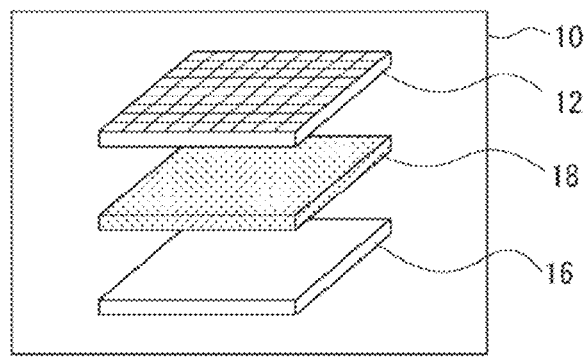
FIG. 8 illustrates another example of the configuration of the image-capturing sensor section according to the embodiments.

FIG. 8 illustrates another example of the structure of the image-capturing sensor section 10, where the other example is different from the example of FIG. 7 in that a positional relationship between the computing section 18 and the memory 16 is changed such that the computing section 18 is placed on the memory 16.

Figure 9:
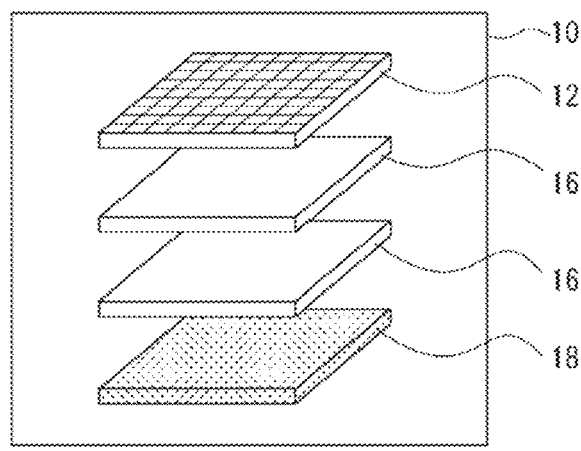
FIG. 9 illustrates yet another example of the configuration of the image-capturing sensor section according to the embodiments.

FIG. 9 illustrates yet another example of the structure of the image-capturing sensor section 10, where the other example is different from the example of FIG. 7 in that the chips of a plurality of the chips of the memory 16 are stacked (two layers in the example of the FIGURE).

Note that the image-capturing sensor section 10 may have a two-layer structure in which the memory 16 is formed in the same layer as the computing section 18, or may have a single-layer structure in which the array sensor 12, the memory 16, and the computing section 18 are formed in the same layer, although illustrations thereof are omitted.

The adoption of the single-package configuration illustrated in FIGS. 7 to 9 makes it possible to take measures, such as the above-described Cu—Cu connection, that is used to increase the resistance to a fraudulent information acquisition from the memory 16 due to disassembly, and this results in obtaining tamper-resistance hardware.

2-4. Procedure of Processing Performed for Image Encryption

Next, a procedure of processing performed by the computing section 18 in order to achieve the image encryption described above is described with reference to a flowchart of FIG. 10.

Note that at least a portion of the processing described below may also be provided as processing performed by hardware.

Figure 10:
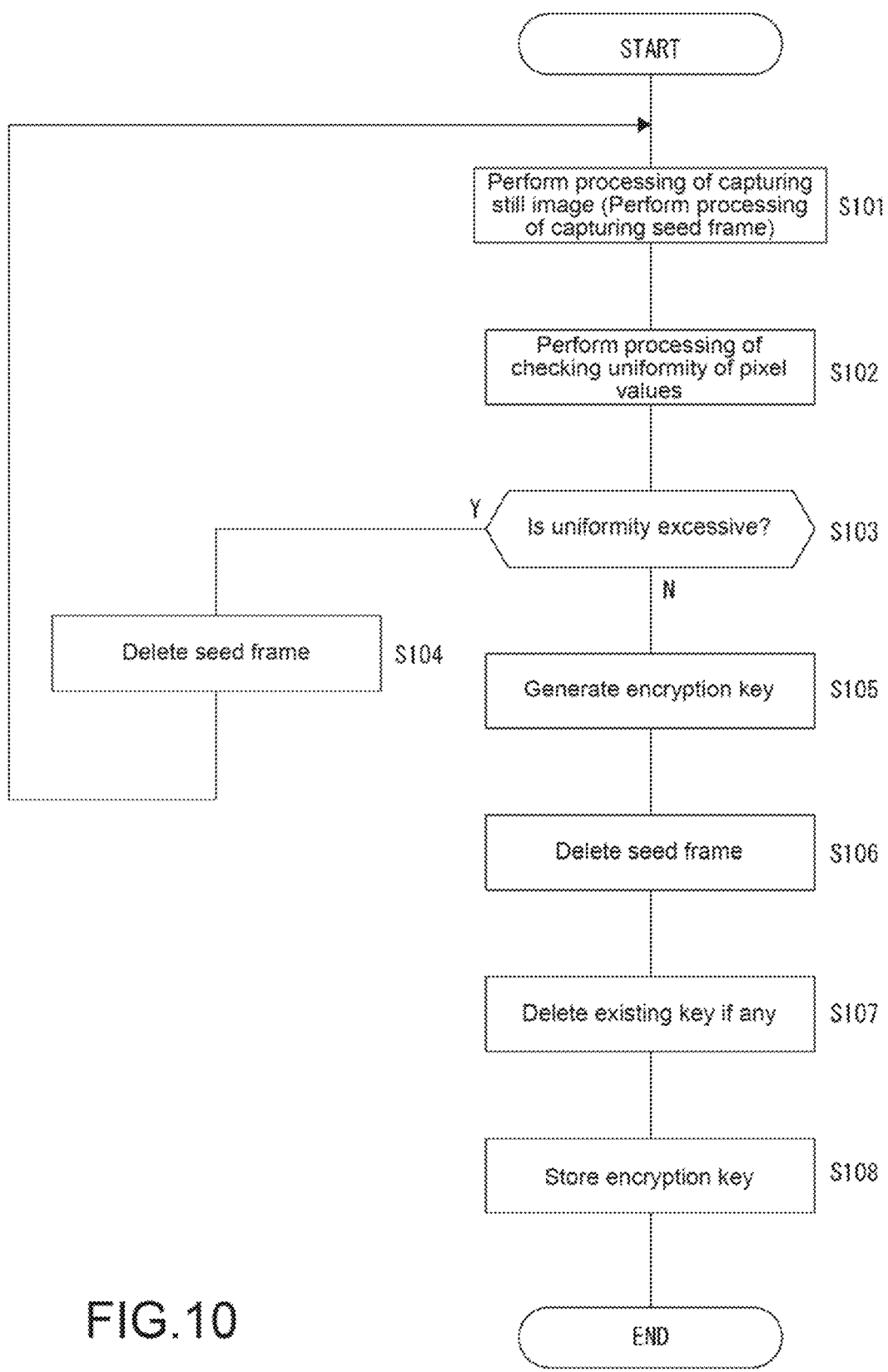
FIG. 10 is a flowchart illustrating a procedure of processing to be performed in order to achieve image encryption according to the embodiments.

First, it is assumed that the computing section 18 of this example starts processing illustrated in FIG. 10, for example, upon activation.

Note that the processing illustrated in FIG. 10 may also be started in response to an unauthorized access to the image-capturing sensor section 10 (such as an unauthorized access to the memory 16) being detected. This results in acquiring photoelectric random numbers (S101) and in generating an encryption key (S105) in response to an unauthorized access being detected. In other words, photoelectric random numbers are reacquired in response to an unauthorized access being detected, and an encryption key is regenerated on the basis of the reacquired photoelectric random numbers. This results in obtaining tamper-resistance software.

Alternatively, the processing illustrated in FIG. 10 may be started on the basis of other conditions, such as the processing being started in response to an instruction from the outside (such as an instruction given in response to an operation input), or the processing being started at regular time intervals.

In FIG. 10, the computing section 18 performs processing of capturing a still image in Step S101. This processing of capturing a still image is performed to capture a still image from which an encryption key is generated, and the computing section 18 performs control on the array sensor 12 such that an image for one frame is captured (a charge for each pixel is read).

When the processing of capturing a still image in Step S101 is performed, this results in image data corresponding to a seed frame being stored in the memory 16.

In Step S102, which is subsequent to Step S101, the computing section 18 performs processing of checking the uniformity of pixel values. This processing of checking the uniformity is processing of checking the uniformity of brightness values of respective pixels in the seed frame. Specifically, the computing section 18 counts the number of pixels of which a brightness value is zero or the number of pixels of which a brightness value is a saturation value (a largest value).

Note that processing of checking the uniformity of values of read signals may also be performed as the processing of checking the uniformity.

In Step S103, which is subsequent to Step S102, the computing section 18 determines whether the uniformity is excessive. Specifically, the computing section 18 determines whether the number of pixels counted in Step S102 is equal to or greater than a specified threshold (for example, a value corresponding to 30% to 50% of valid pixels).

When the computing section 18 has obtained a determination result showing that the number of pixels counted in Step S102 is equal to or greater than the threshold, and the uniformity is excessive, the computing section 18 moves on to Step S104 to perform processing of deleting the seed frame, that is, processing of deleting the image data corresponding to the seed frame and being stored in, for example, the memory 16, and then the computing section 18 returns to Step S101.

This results in being able to capture a seed frame again when the degree of randomness of pixel values of a seed frame is low. In other words, photoelectric random numbers can be acquired again when the degree of randomness of photoelectric random numbers is low.

This makes it possible to prevent encryption from being performed using an encryption key based on random numbers with a low degree of randomness, and thus to enhance the security.

On the other hand, when, in Step S103, the computing section 18 has obtained a determination result showing that the number of pixels counted is less than the threshold, and the uniformity is not excessive, the computing section 18 moves on to Step S105 to generate an encryption key. Specifically, in this example, an encryption key that represents coefficients that are to be set for respective amplifiers included in the amplitude control circuit 19 (or 19A) is generated on the basis of brightness values of respective pixels in the seed frame.

In this example, in the process of Step S105, an encryption key is not generated on the basis of photoelectric random numbers obtained by assigning, with no change, brightness values for respective pixels to pixel positions at which the brightness values are actually obtained. The encryption key is generated on the basis of photoelectric random numbers obtained by assigning at least a portion of the brightness values for the respective pixels to pixel positions that are different from pixel positions at which the assigned brightness values are actually obtained.

This makes it more difficult to decrypt an encryption key, and thus makes it possible to enhance the security.

In Step S106, which is subsequent to Step S105, the computing section 18 performs processing of deleting the seed frame, that is, processing of deleting the image data corresponding to the seed frame and being stored in, for example, the memory 16 by the image-capturing processing in Step 101.

When the processing of deleting the seed frame is performed, this makes it possible to prevent an image from which photoelectric random numbers are generated from leaking out, and to prevent the photoelectric random numbers from being estimated.

Note that, when, for example, the computing section 18 has a great processing capability or the image size of a seed frame is small, the seed frame does not necessarily have to be stored in the memory 16. In this case, for example, the computing section 18 (the encryption controller 84) receives photoelectric random numbers from the amplitude control circuit 19 (or 19A), and performs the processes of Steps S102 and S103 to generate an encryption key in Step S105. In this case, there is no need for the deletion processing of Step S106 (of course there is also no need for the deletion processing of Step S104).

Subsequently, in Step S107, the computing section 18 deletes an existing key if any. When, for example, the processing illustrated in FIG. 10 is started at regular time intervals, an encryption key is stored in the memory 16 by the process of Step S108 being performed in the past. The process of Step S107 corresponds to processing of deleting an existing encryption key if the existing encryption key is stored in the memory 16, as described above.

When such processing of deleting an existing key is performed, this makes it possible to prevent an encryption key used for encryption in the past from leaking out, and to prevent a signal encrypted in the past from being fraudulently decrypted.

Subsequently, in Step S108, the computing section 18 performs processing of storing the encryption key. In other words, processing of storing, in the memory 16, the encryption key generated in Step S105 is performed.

In response to the storing processing of Step S108 being performed, the computing section 18 terminates the series of processes illustrated in FIG. 10.

In the image-capturing apparatus 1, image data (captured-image data) obtained by image-capturing being performed by the array sensor 12 is encrypted using the encryption key stored in Step S108. Specifically, after the processing illustrated in FIG. 10 is terminated, the computing section 18 (the encryption controller 84) sets, for respective amplifiers included in the amplitude control circuit 19 (or 19A), coefficients for respective pixels based on the stored encryption key, so that an image signal obtained by image-capturing being performed by the array sensor 12 is encrypted on the basis of the stored encryption key.

In this example, the array sensor 12 captures a moving image, and the amplitude control circuit 19 (or 19A) encrypts respective frame images included in the moving image.

In this example, captured-image data that is a moving image and is encrypted as described above is stored in the memory section 24 under the control of the controller 23. The controller 23 can transmit the captured-image data stored in the memory section 24, as described above, to the fog server 2 through the communication section 25.

As will be appreciated from the description above, in this example, image data is encrypted on the basis of photoelectric random numbers obtained during a frame period that is different from a frame period of encryption-target image data.

This makes it more difficult to estimate an encryption key from an encrypted image, and thus makes it possible to enhance the security.

Note that image data may also be encrypted on the basis of photoelectric random numbers obtained during the same frame period as encryption-target image data.

2-5. Encryption for Each Level

In the image-capturing apparatus 1 of this example, encryption is performed on a specified target region in image data. Specifically, the entirety of an image and a target region are respectively encrypted using different encryption keys, and, from among the target region, a region of a specific portion and a region other than the region of the specific portion are respectively encrypted using different encryption keys. This results in the level of confidentiality of information being gradually changed according to a decryption key held by a recipient of the image (encryption for each level).

Figure 11:
FIG. 11 illustrates a notion of encryption for each level when the target class is a person.
Figure 11:
Figure 11:
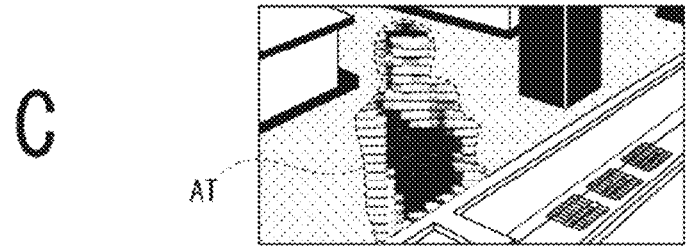
Figure 11:
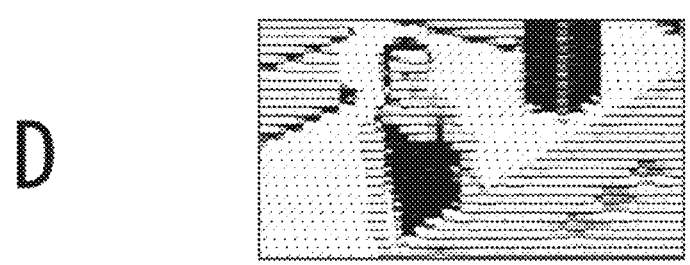
Figure 12:
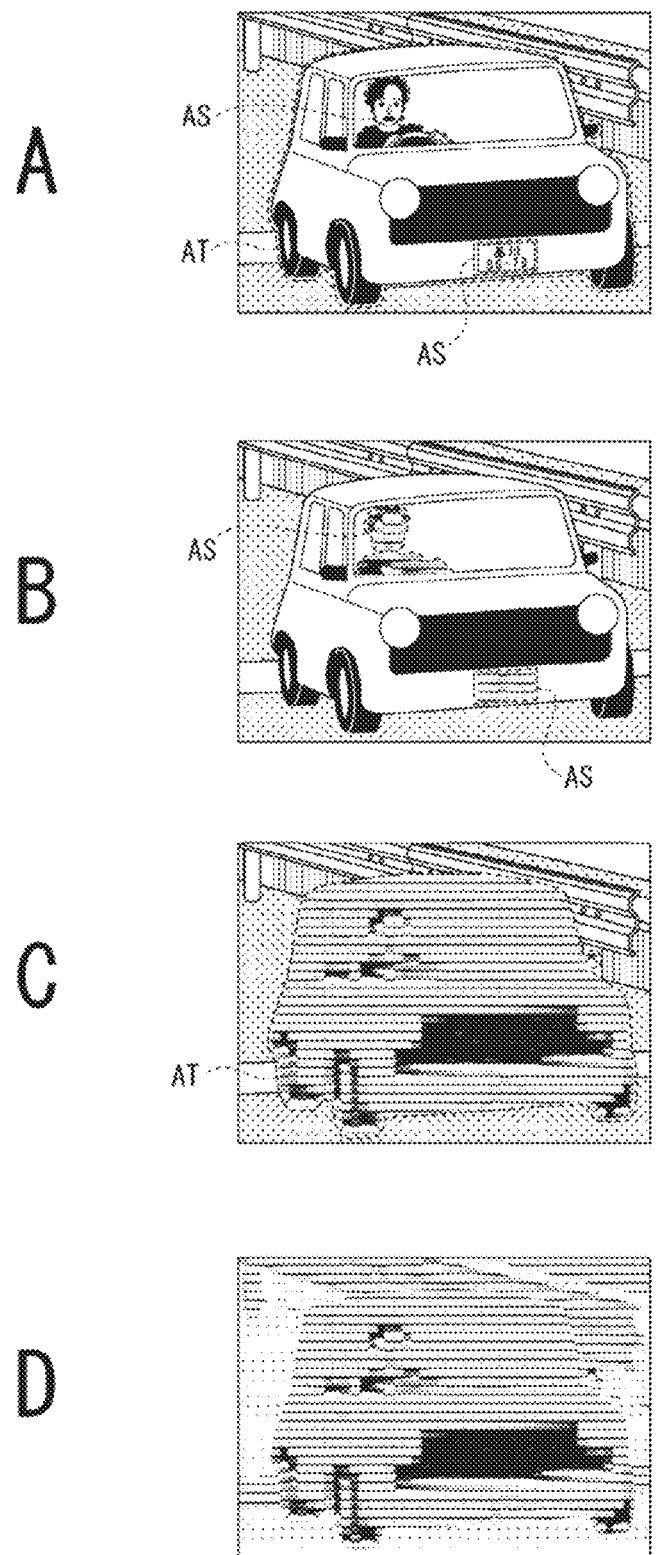
FIG. 12 illustrates a notion of the encryption for each level when the target class is a vehicle.

FIGS. 11 and 12 are diagrams used to describe a notion of encryption for each level.

FIG. 11 illustrates a notion of the encryption for each level when the target class is a person.

A of FIG. 11 illustrates an image before encryption. In this case, a target region AT is the entirety of a region of a portion, in the image, in which the person appears. Further, in this case, a specific region AS that is a region of a specific portion is a region of a face of the person.

B of FIG. 11 illustrates an image in which only the specific region AS is encrypted, C of FIG. 11 illustrates an image in which only the target region AT including the specific region AS is encrypted, and D of FIG. 11 illustrates an image in which the entirety of a region in the image is encrypted.

FIG. 12 illustrates a notion of the encryption for each level when the target class is a vehicle, and A of FIG. 12 illustrates an image before encryption.

In this case, the target region AT is the entirety of a region of a portion, in the image, in which the vehicle appears, and the specific region AS is a region of an occupant and a license plate of the vehicle.

B of FIG. 12 illustrates an image in which only the specific region AS is encrypted, C of FIG. 12 illustrates an image in which only the target region AT including the specific region AS is encrypted, and D of FIG. 12 illustrates an image in which the entirety of a region in the image is encrypted.

In the examples of FIGS. 11 and 12, at least three types of encryption keys are generated, the three types of encryption keys being a first encryption key that corresponds to an encryption of the entirety of a region in an image, a second encryption key that corresponds to only an encryption of the target region AT, and a third encryption key that corresponds to only an encryption of the specific region AS.

Figure 13:
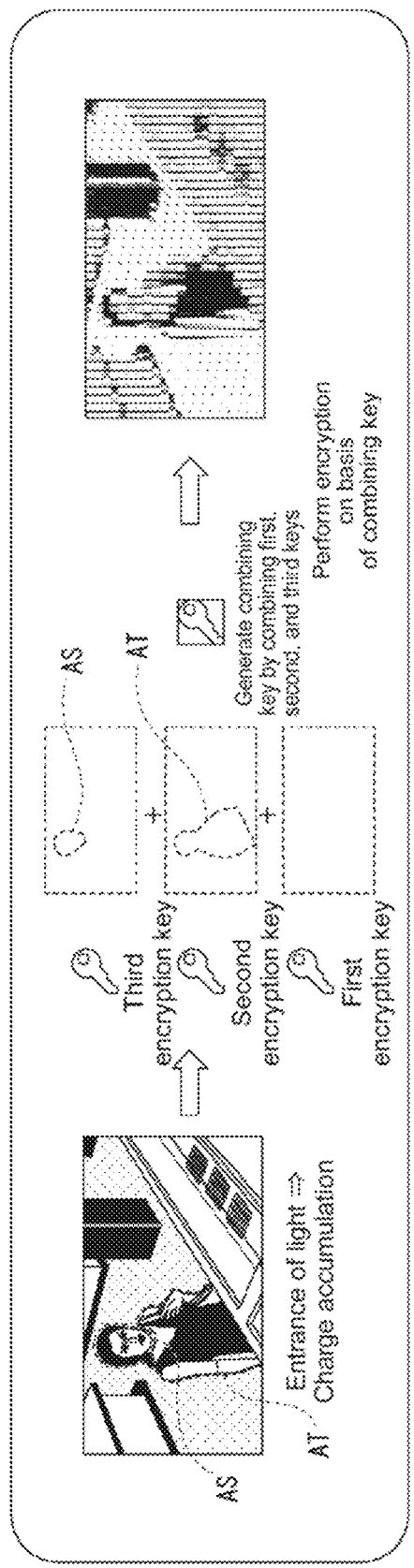
FIG. 13 is a diagram used to describe an example of a specific method for performing encryption for each level.

FIG. 13 is a diagram used to describe an example of a specific method for gradually performing encryption.

In this example, encryptions based on the first, second, and third encryption keys are not respectively performed on a target image, and the target image is encrypted on the basis of a combining key obtained by combining these encryption keys.

First, the third encryption key used to encrypt the specific region AT, the second encryption key used to encrypt the entirety of the target region AT, and the first encryption key used to encrypt the entirety of a region in an image are prepared. In order to generate these three types of encryption keys, three types of sets of photoelectric random numbers may be obtained (that is, images for three types of seed frames are captured). In this example, three types of encryption keys are generated from a shared set of photoelectric random numbers, in order to reduce the time necessary to generate the encryption keys. Specifically, in this example, when the three types of encryption keys are generated, three types of sets of random numbers (hereinafter respectively referred to as a first set of random numbers, a second set of random numbers, and a third set of random numbers) are first generated, where the arrangement of values for respective pixels in shared photoelectric random numbers is changed from the original arrangement of the values for each of the three types of sets of random numbers.

Then, an encryption key obtained by extracting values for respective pixels for the specific region AS from the values in the third set of random numbers is generated as the third encryption key.

Further, an encryption key obtained by extracting values for respective pixels for the target region AT from the values in the second set of random numbers is generated as the second encryption key.

Furthermore, an encryption key obtained by applying the first set of random numbers with no change is generated as the first encryption key.

Then, an encryption key obtained by combining the first, second, and third encryption keys is generated as a combining key, as illustrated in the figure.

Further, a target image is encrypted on the basis of the combining key.

The above-described gradual encryption makes it possible to change the level of confidentiality of information according to a decryption key held by a recipient of an image (the reception apparatus 3).

Figure 14:
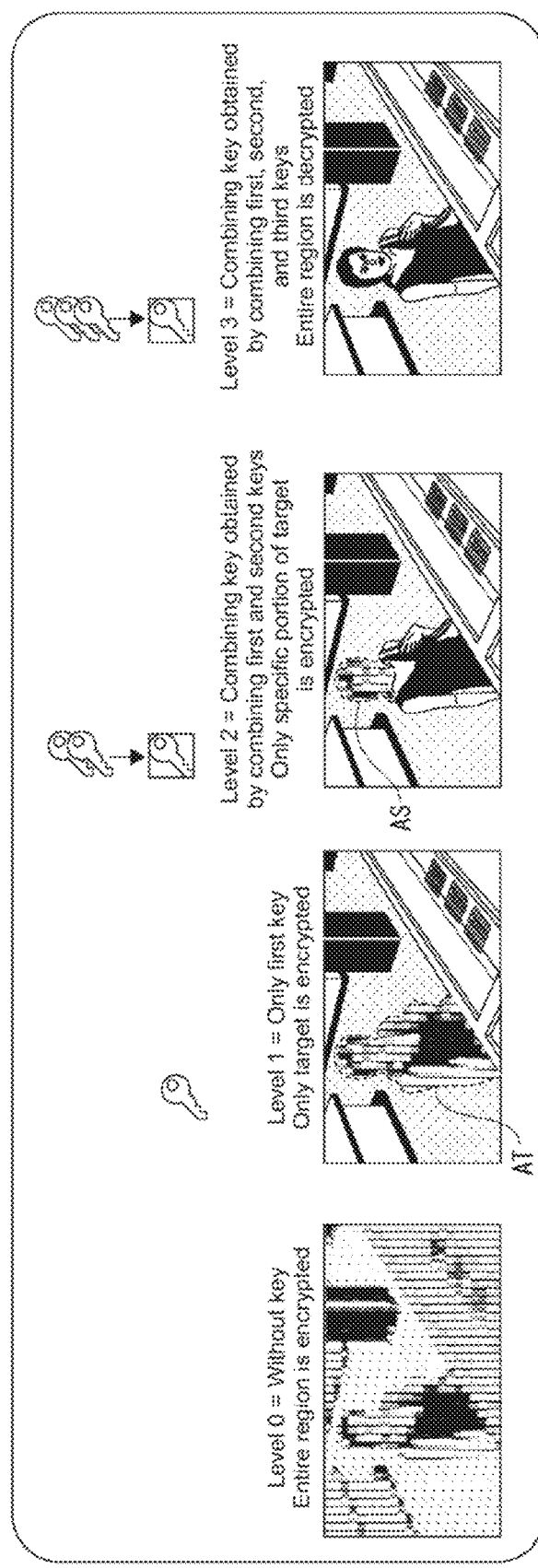
FIG. 14 is a diagram used to describe an example of a change in level of confidentiality.

FIG. 14 is a diagram used to describe an example of a change in level of confidentiality.

Here, four levels from a level 0 to a level 3 are defined as a level regarding holding of a key. As illustrated in the FIGURE, the level 0 refers to a state without a key, the level 1 refers to a state of only holding the first encryption key, the level 2 refers to a state of holding a combining key obtained by combining the first and second encryption keys, and the level 3 refers to a state of holding a combining key obtained by combining the first, second, and third encryption keys.

At the level 0, an encrypted image is not decrypted by a recipient of an image, and this results in obtaining the image in which the entirety of a region is encrypted.

At the level 1, the recipient of the image can decrypt a portion of a region other than the target region AT using the first encryption key, and this results in obtaining the image in which only the target region AT is encrypted.

At the level 2, the recipient of the image can decrypt a portion of a region other than the specific region AS using the combining key obtained by combining the first and second encryption keys, and this results in obtaining the image in which only the specific region AS in the target is encrypted.

At the level 3, the recipient of the image can decrypt the entirety of a region in the image using the combining key obtained by combining the first, second, and third encryption keys, and this results in obtaining the image in which no information is kept confidential.

Note that, in this example, an encryption-target image is a moving image. Thus, the location of a target object appearing in an image may be changed in the image over time. Thus, when the target region AT is encrypted as described above, there is a need to track a target.

An example of a specific method for performing encryption for each level that includes the tracking a target is described with reference to FIG. 15.

Figure 15:
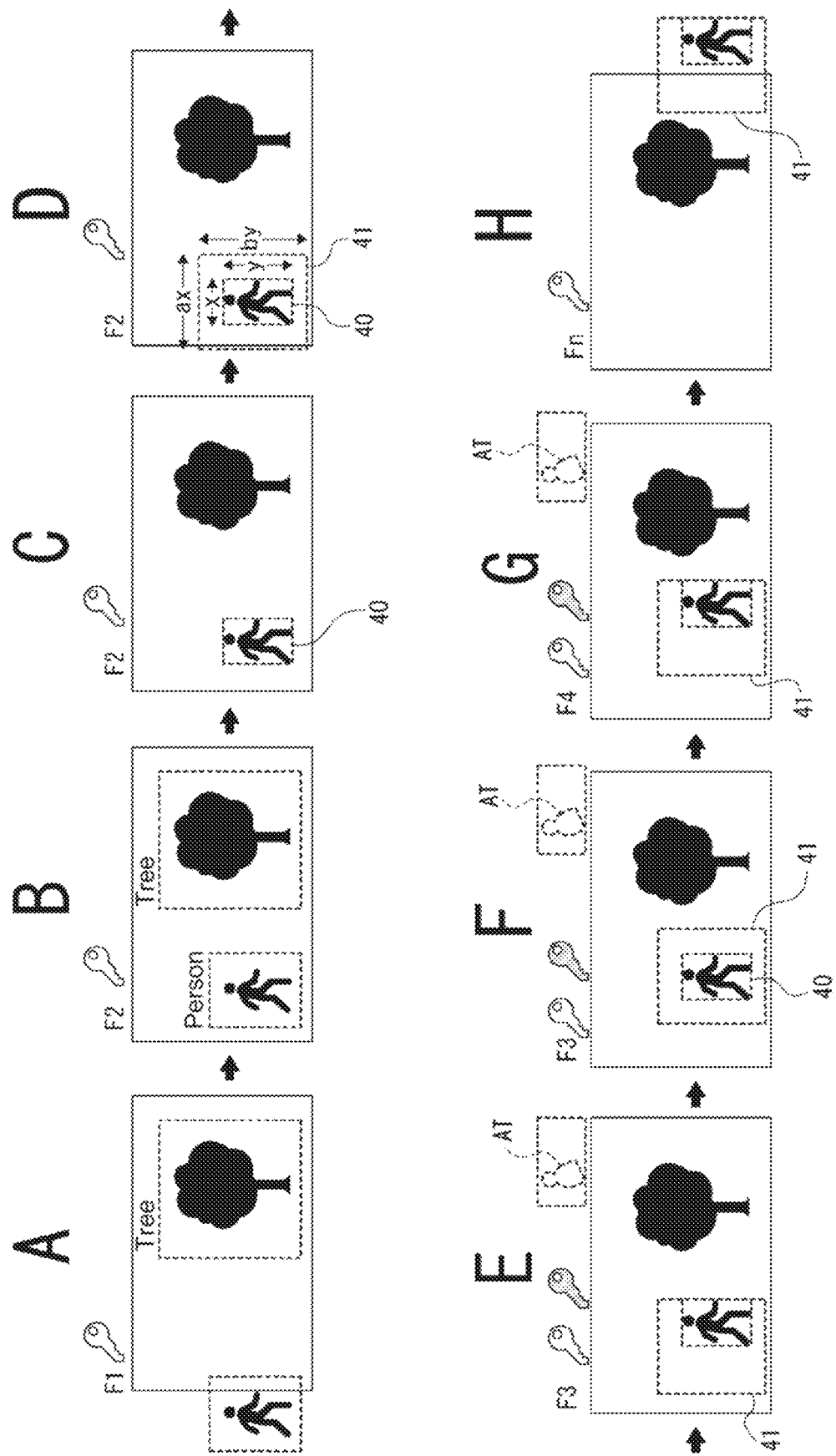
FIG. 15 is a diagram used to describe an example of a specific method for performing encryption for each level.

Note that it is assumed that the class of a target is a "person" in FIG. 15. Further, for convenience of description, FIG. 15 illustrates an example in which only the target region AT and a region other than the target region AT in an image are distinguished from each other upon encryption, without the specific region AC being distinguished from a region other than the specific region AC in the target region AT.

First, A of FIG. 15 illustrates a frame F1 in which a person corresponding to a target class is not yet within the frame. Note that, here, A of FIG. 15 illustrates an example in which an object that is a "tree" and is not a target class is identified in the image.

Here, the entirety of a region of the image is encrypted regardless of whether there exists a target. In other words, in this example, an image of each frame F is encrypted by the amplitude control circuit 19 (or 19A) on the basis of the first encryption key corresponding to the entirety of a region of the image, and then the encrypted image is stored in the memory 16. A white key mark illustrated in each diagram of FIG. 15 represents a state in which the entirety of a region of an image that is an output image is encrypted.

In order to track a target, the computing section 18 detects a region of an object in an image and performs class identification on the object (the process performed by the object region recognizing section 82 and the process performed by the class identification section 83 described above). In order to perform these processes, the computing section 18 decrypts a frame image encrypted and stored as described above. In other words, the computing section 18 performs processing for tracking a target while decrypting a frame image encrypted on the basis of the first encryption key.

The computing section 18 performs the decryption using the on-the-fly method. This makes it possible to reduce the possibility that an image signal in the form of a plaintext will leak out when a target is tracked, and thus to enhance the security.

B of FIG. 15 illustrates a frame F2 in which the "person" corresponding to a target class is within the frame. In this state, the "person" corresponding to a target class is identified together with the identified "tree".

When an object corresponding to a target class is identified, as described above, the computing section 18 (the object region recognizing section 82) calculates a bounding box 40 that has accurate positional coordinates and surrounds a region of the object.

For example, C of FIG. 15 illustrates an example of the bounding box 40 for an image of a person that is a target class. In other words, the bounding box 40 is calculated as a more accurate region of an object that corresponds to the target class.

Further, on the basis of the bounding box 40, the computing section 18 (the object region recognizing section 82) calculates a ROI 41 that is a region of interest.

D of FIG. 15 illustrates the ROI 41 and the bounding box 40. For example, the ROI 41 is calculated by enlarging (a×xb×y) the length-and-width size (x×y) of the bounding box 40. Scales a and b used for enlargement can be set individually for the length and the width. An enlargement ratio may be fixed, or may be specified from the outside of the image-capturing sensor section 10 (such as the image processor 21).

In this example, the ROI 41 is used as the target region AT, and encryption is performed using an encryption key that is different from the encryption key used for the entirety of a region of an image.

Here, the frame F2 is a frame in which a target class has been newly identified in an image, and can also be called a target class finding frame.

In this example, a method for encrypting a signal read from a pixel is adopted. Thus, it is difficult to encrypt the ROI 41 on the basis of the second encryption key with respect to the target class finding frame. The target class finding frame has been encrypted only on the basis of the first encryption key, and is stored in the memory 16. When the target class finding frame encrypted only on the basis of the first encryption key is output with no change, as described above, an image region of the ROI 41 without being confidential is disclosed to a recipient only holding the first encryption key.

Thus, in this example, the target class finding frame is deleted from the memory 16 such that an appropriate level of confidentiality of information depending on the decryption key held by a recipient of an image is achieved.

E of FIG. 15 illustrates a frame F3 that is a frame next to the frame F2.

In and after the frame F next to the target class finding frame, the ROI 41 is encrypted on the basis of the second encryption key. Here, the ROI 41 is the ROI 41 calculated in the frame F2 corresponding to the target class finding frame.

When the "person" corresponding to a target class is moving, the person in the frame F3 is further displaced in a movement direction, compared to the frame F2. However, the person corresponding to a target class is within the ROI 41 in the frame F3 by setting a range larger than the bounding box 40 to be the ROI 41. In other words, the person corresponding to a target class is within a range that is to be encrypted on the basis of the second encryption key.

In and after the frame F3, the bounding box 40 and the ROI 41 are similarly calculated with respect to a target class such that the target class is tracked (refer to F of FIG. 15).

Further, in and after the frame F4, the ROI 41 calculated for a most recent frame F is encrypted on the basis of the second encryption key, as in the case of the frame F3 (refer to G of FIG. 15).

H of FIG. 15 illustrates a frame Fn after the "person" corresponding to a target class goes out of the frame. When the target class goes out of the frame, the ROI 41 is not calculated. Thus, an image for the frame Fn is encrypted only on the basis of the first encryption key.

Note that the example in which a rectangular region obtained by enlarging the bounding box 40 is set to be the ROI 41 has been described above. However, the ROI 41 is not limited to a rectangular region.

For example, the ROI 41 may be calculated from a region of a target-class object using semantic segmentation, that is, an object-region detection for each pixel.

Figure 16:
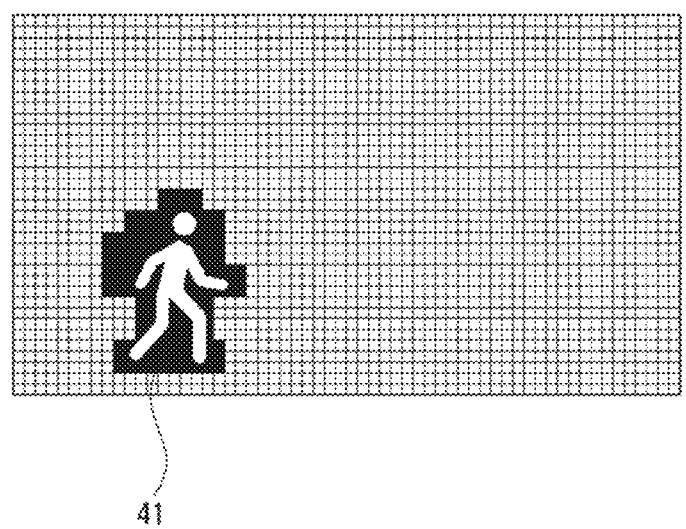
FIG. 16 is a diagram used to describe a modification of an ROI.

FIG. 16 illustrates the ROI 41 based on semantic segmentation. This is an example in which a pixel region corresponding to an object (such as a person) is expanded to be set to be the non-rectangular ROI 41.

For example, when the target-class object is, for example, a truck with a protrusion, or a person who is riding a bicycle, there is a possibility that a portion of the target-class object will not be within the rectangular ROI 41 or will be too large. When the non-rectangular ROI 41 is generated according to the object location for each pixel, this makes it possible to appropriately set a confidential region related to a target not excessively or insufficiently.

2-6. Procedure of Processing Performed for Encryption for Each Level

The procedure of processing performed by the computing section 18 in order to achieve the image encryption described above according to a second embodiment is described with reference to a flowchart of FIGS. 17 and 18.

Figure 17:
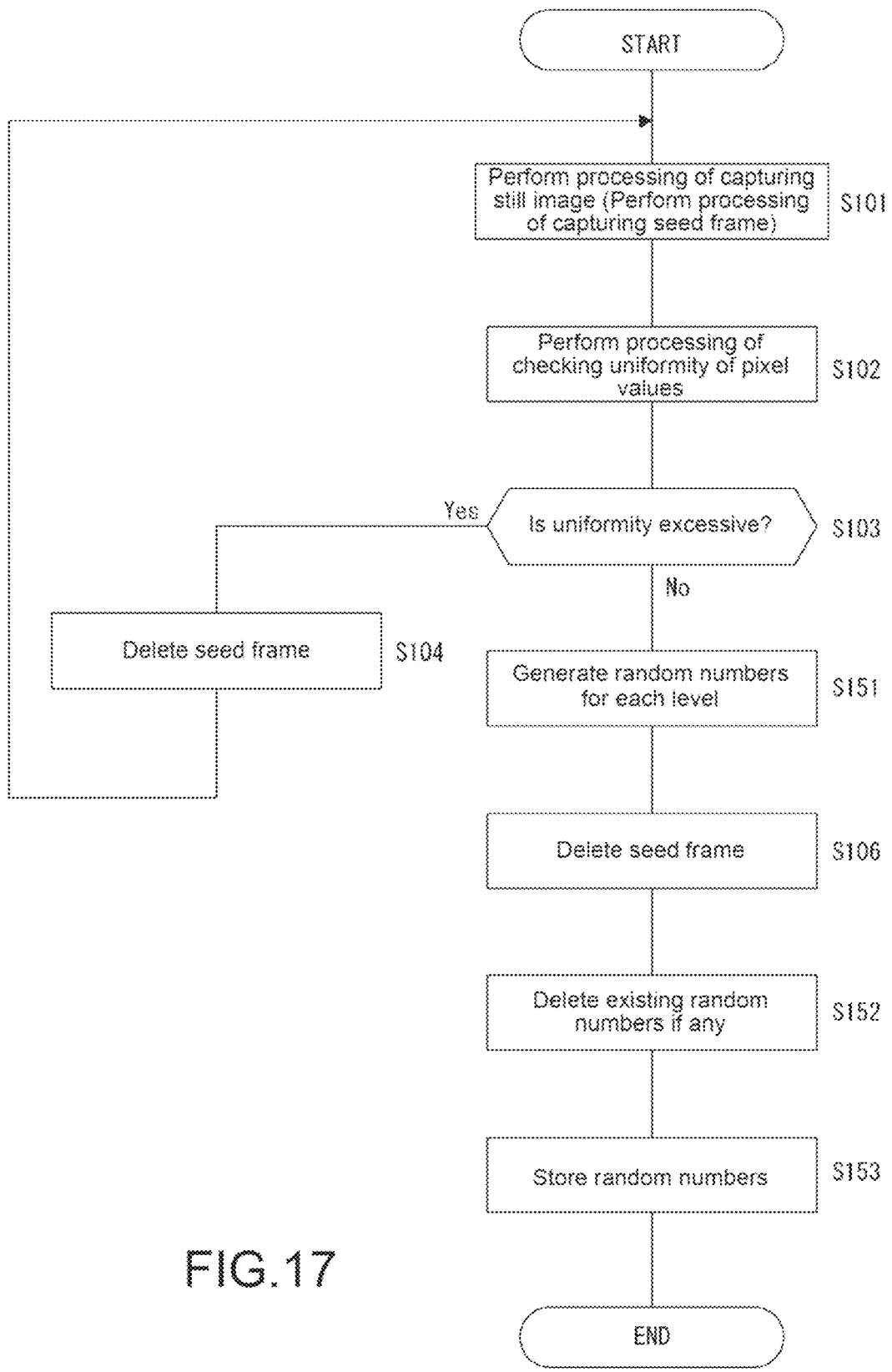
FIG. 17 is a flowchart illustrating processing that is performed upon encryption for each level and corresponds to steps from capturing a seed frame to storing random numbers from which an encryption key is generated.

FIG. 17 illustrates processing that corresponds to steps from capturing a seed frame to storing random numbers from which an encryption key is generated. Note that, in FIG. 17, a process similar to the process described with reference to FIG. 10 is denoted by a step number similar to the step number used in FIG. 10, and a description thereof is omitted.

As in the case of the processing of FIG. 10, the processing of FIG. 17 may be started upon activation. Alternatively, the processing of FIG. 17 may also be started on the basis of other conditions, such as the processing being started in response to an unauthorized access to the image-capturing sensor section 10 being detected, or the processing being started at regular time intervals.

Note that at least a portion of the processing described with reference to FIGS. 17 and 18 may also be provided as processing performed by hardware.

In FIG. 17, when the computing section 18 in this case has determined, in Step S103, that the uniformity is not excessive, the computing section 18 moves on to Step S151 to generate random numbers for each level. Here, the specific region AS is not distinguished in the target region AT. Thus, two types of sets of random numbers that are the first set of random numbers and the second set of random numbers described above are generated as random numbers.

Note that the method for generating various types of sets of random numbers on the basis of photoelectric random numbers of a seed frame has already been described above. Thus, the description is not made repeatedly.

In response to performing the processing of generating random numbers in Step S151, the computing section 18 performs the processing of deleting a seed frame in Step S106.

Then, in response to performing the deletion processing in Step S106, the computing section 18 performs processing of deleting existing random numbers if any in Step S152. In other words, when there are random numbers for each level (the first set of random numbers and the second set of random numbers) that have been stored in the memory 16 in the process of Step S153 performed in the past, the deletion processing is processing of deleting those random numbers.

In Step S153, which is subsequent to Step S152, the computing section 18 performs processing of storing, in the memory 16, the random numbers for each level being generated in Step S151, and terminates the series of processes illustrated in FIG. 17.

Figure 18:
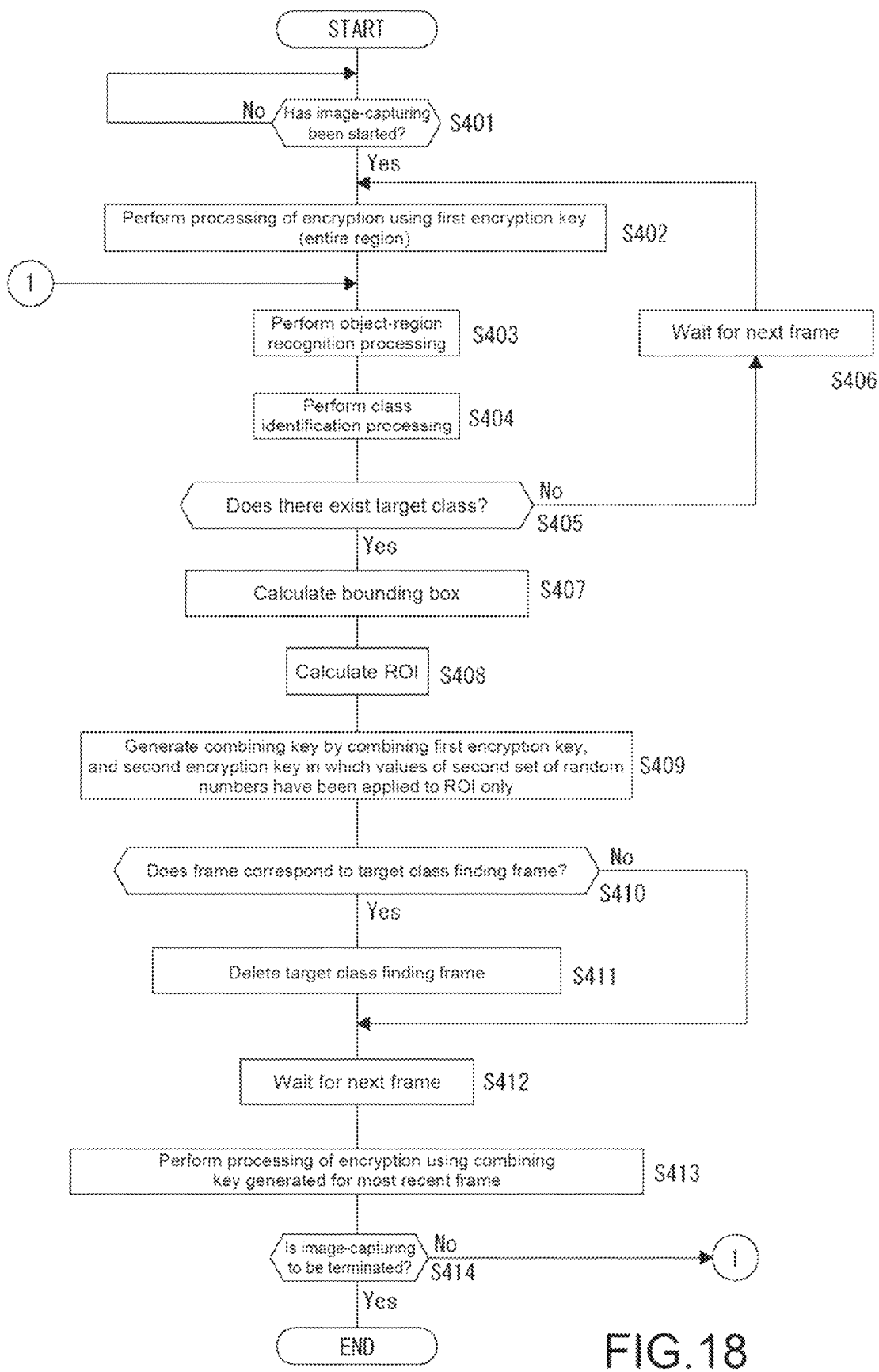
FIG. 18 is a flowchart illustrating processing of encrypting a target image on the basis of a generated encryption key upon encryption for each level.

FIG. 18 illustrates processing of encrypting a target image on the basis of a generated encryption key.

First, the computing section 18 waits for a start of capturing an encryption-target image in Step S401. When image-capturing is started, the computing section 18 performs processing of encryption using the first encryption key in Step S402. In other words, the computing section 18 indicates, to the amplitude control circuit 19 (or 19A), coefficients for respective pixels based on the first encryption key such that the amplitude control circuit 19 (or 19A) encrypts a signal read from the array sensor 12. As will be appreciated from the description above, in this example, the first encryption key is an encryption key obtained by applying the first set of random numbers with no change.

In Step S403, which is subsequent to Step S402, the computing section 18 performs object-region recognition processing. Subsequently, in Step S404, the computing section 18 further performs class identification processing. The object-region recognition processing in Step S403 is the above-described processing performed by the object region recognizing section 82, and is processing including detecting a candidate object from an image for a current frame, and recognizing a region of the candidate object. Further, the class identification processing in Step S404 is the above-described processing performed by the class identification section 83, and performs class identification on an object detected by the above-described object-region recognition processing being performed. When a plurality of objects or a plurality of types of objects is detected, the class identification is performed for each object, and the respective objects are grouped into classes. For example, in the case of B of FIG. 15 described above, class identification and classification are performed as indicated below: one object for the class "tree", and one object for the class "person".

Note that the computing section 18 performs the processes of Steps S403 and S404 while decrypting a frame image encrypted in Step S402, or in Step S413 described later, using the on-the-fly method.

In Step S405, which is subsequent to Step S404, the computing section 18 determines whether there exists a target class. In other words, the computing section 18 determines whether there exists a target class from among the classes identified in Step S404.

When there exists no target class, the computing section 18 waits for a next frame in Step S406 (waits for a start of a next frame period), and then returns to Step S402. In other words, the processing of encrypting the entirety of a region of an image in Step S402, the object-region recognition processing in Step S403, and the class identification processing in Step S404 are repeated for each frame until a target class is detected.

When the computing section 18 has determined, in Step S405, that there exists a target class, the computing section 18 moves on to Step S407 to calculate the bounding box 40. Subsequently, in Step S408, the computing section 18 calculates the ROI 41.

Subsequently, in Step S409, the computing section 18 generates a combining key by combining the first encryption key, and the second encryption key in which values of the second set of random numbers have been applied to the ROI 41 only.

In response to generating the combining key in Step S409, the computing section 18 determines, in Step S410, whether the current frame is a target class finding frame. When the current frame is a target class finding frame, the computing section 18 performs processing of deleting the target class finding frame in Step S411. This makes it possible to prevent a target portion in an image from not being kept confidential in spite of the fact that the level of key holding is the level 1 with respect to the target class finding frame.

When the computing section 18 has determined, in Step S410, that the current frame is not a target class finding frame, the computing section 18 skips the deleting processing in Step S411, and performs processing of waiting for a next frame in Step S412. Further, when the computing section 18 performs the deleting processing in Step S411, the computing section 18 also performs the processing of waiting for a next frame in Step S412.

In response to performing the awaiting processing in Step S412, the computing section 18 performs, in Step S413, processing of encryption using a combining key generated for a most recent frame. In other words, the computing section 18 indicates, to the amplitude control circuit 19 (or 19A), coefficients for respective pixels based on the combining key such that the amplitude control circuit 19 (or 19A) encrypts a signal read from the array sensor 12.

In Step S414, which is subsequent to Step S413, the computing section 18 determines whether the image-capturing is to be terminated, that is, whether the capturing of an encryption-target image is to be terminated due to, for example, an instruction to terminate the image-capturing being given from the outside.

When the computing section 18 has determined that the image-capturing is not to be terminated, the computing section 18 returns to Step S403. Accordingly, the processes described above are repeated until image-capturing is terminated. In other words, when there still exits a target class, the ROI 41 for the target class is calculated, a combining key is generated on the basis of the calculated ROI 41, and the encryption processing is performed on the basis of the combining key generated for a most recent frame. When there exists no longer a target class, the processing of encryption using the combining key is not performed, and processing of encryption using the first encryption key is performed.

When the computing section 18 has determined that the image-capturing is to be terminated, the computing section 18 terminates the series of processes illustrated in FIG. 18.

Note that, in this example, a region obtained by expanding the bounding box 40 is set to be the ROI 41, such that a target object can be within the ROI 41 in a next frame. However, the enlargement scales a and b used for enlargement when the length-and-width size (x×y) is enlarged (ax 33 by) may correspond to the frame rate.

For example, when the frame rate is low, a period of time corresponding to frame spacing becomes long, and an amount of movement of an object such as a person becomes large. Thus, the ROI 41 may be made larger, compared to when the frame rate is higher.

Note that, when the target region AT is encrypted, with a region of a specific portion being distinguished from a region other than the region of the specific portion, the bounding box 40 and the ROI 41 are calculated for the specific portion using a method similar to the method described above, and the third encryption key in which values of the third set of random numbers have been applied to the calculated ROI 41, is generated. It is sufficient if, then, a combining key obtained by combining the first, second, and third encryption keys is generated to be used to encrypt an image for a next frame.

3. Processing Related to Feature Information (Normal Mode)

As described above, in the image-capturing apparatus 1 of the present embodiment, feature information regarding a subject in a captured image can be detected by the feature detector 85. Specifically, the feature detector 85 of this example can detect feature information that indicates a feature of an object (a subject) of a target class from among the classes described above.

For example, when an image obtained by image-capturing being performed by the array sensor 12 is an in-store monitoring image, and when a person (a customer) is set to be a target class, this enables a user to grasp attributes of the customer such as a gender, an age, and a height of the customer or to grasp a movement of the customer such as a movement route of the customer (a line of flow of customers) in the store and a change in a pose of the customer, on the basis of the above-described feature information regarding the person.

Further, when an image obtained by image-capturing being performed by the array sensor 12 is an image used to monitor a vehicle that is traveling on a road, and when a vehicle is set to be a target class, this enables a user to grasp attributes of the vehicle such as a model and a color of the vehicle, the number of occupants, and a gender of an occupant; a line of flow on the road; and information regarding movement such as a vehicle speed.

As an operation mode regarding feature information, the information processing system 100 of this example has a normal mode in which each image-capturing apparatus 1 transmits a captured image and feature information to the cloud server 3 while continuously performing an image-capturing operation and detecting a feature of a subject.

Figure 19:
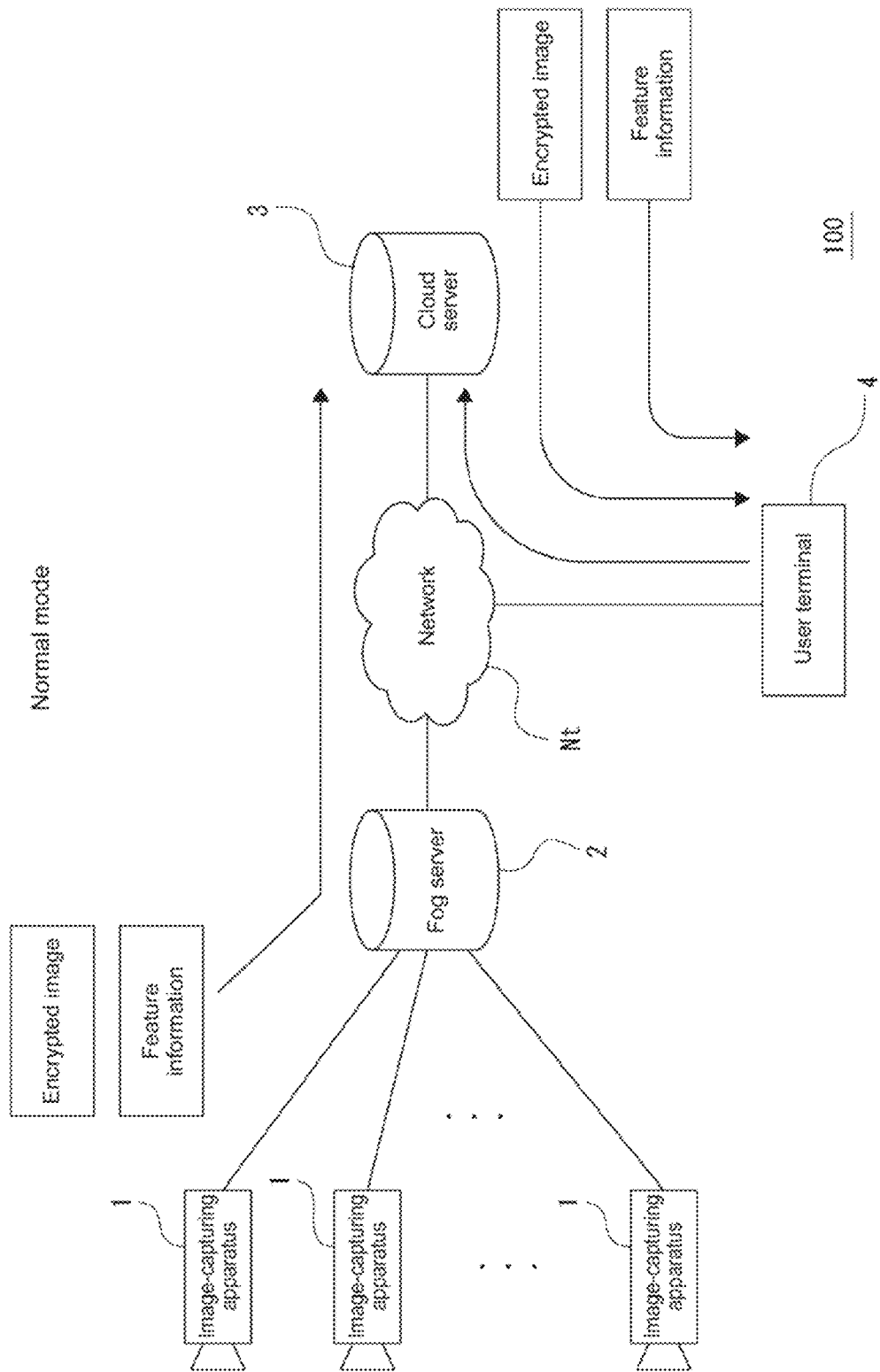
FIG. 19 is a diagram used to describe a normal mode according to the embodiments.

FIG. 19 is a diagram used to describe the normal mode.

In the normal mode, an encrypted captured image (referred to as an "encrypted image" in the FIGURE) obtained by each image-capturing apparatus 1 performing the processes illustrated in FIGS. 10, 17, and 18, and feature information regarding a subject that is detected by the feature detector 85 pass through the fog server 2 and the network Nt to be uploaded to the cloud server 3 from the image-capturing apparatus 1. The cloud server 3 stores, in, for example, the storage 38 (refer to FIG. 3), the captured image and feature information uploaded as described above.

The user terminal 4 makes a request that the cloud server 3 transmit the captured image and the feature information to the user terminal 4, and performs processing for causing a user to view the captured image and feature information received from the cloud server 3. An application (an application program) that enables viewing of the captured image and feature information stored in the cloud server 3 is installed on the user terminal 4, and this enable the user to view the captured image and the feature information using the application. In this example, the encrypted captured image is stored in the cloud server 3. Thus, a function of decrypting an encrypted captured image is provided to the application. For example, when a captured image is encrypted only on the basis of the first encryption key, as described above (that is, when encryption is performed by the processing illustrated in FIG. 10), a decryption key corresponding to the first encryption key is stored in the user terminal 4, and the application decrypts the encrypted captured image using the decryption key. Alternatively, when a captured image is encrypted for each level, as described above, a decryption key depending on the user's level of key holding is stored in the user terminal 4, and the application decrypts the encrypted captured image using the decryption key.

Figure 20:
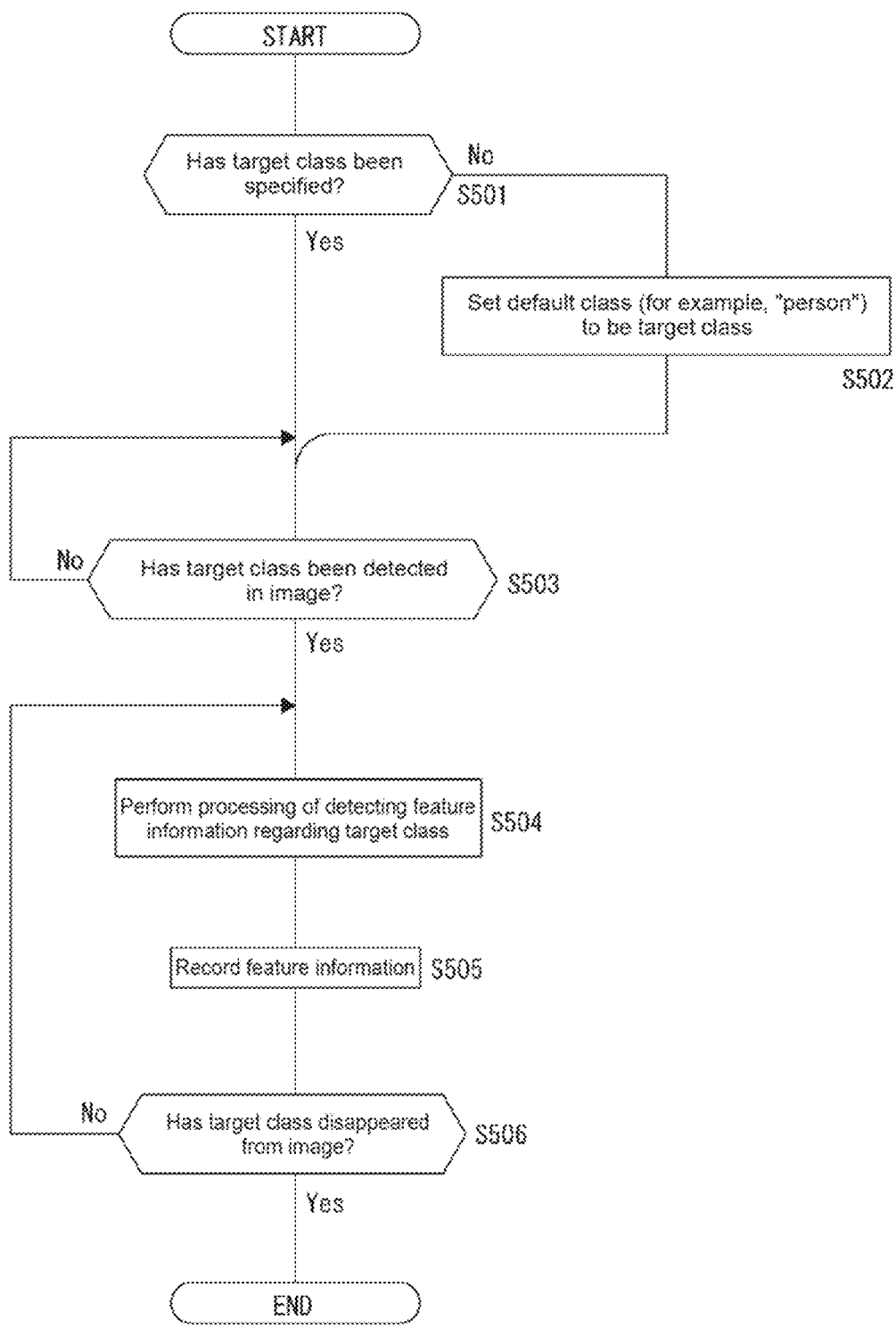
FIG. 20 is a flowchart illustrating an example of processing related to recording of feature information in the normal mode.
Figure 21:
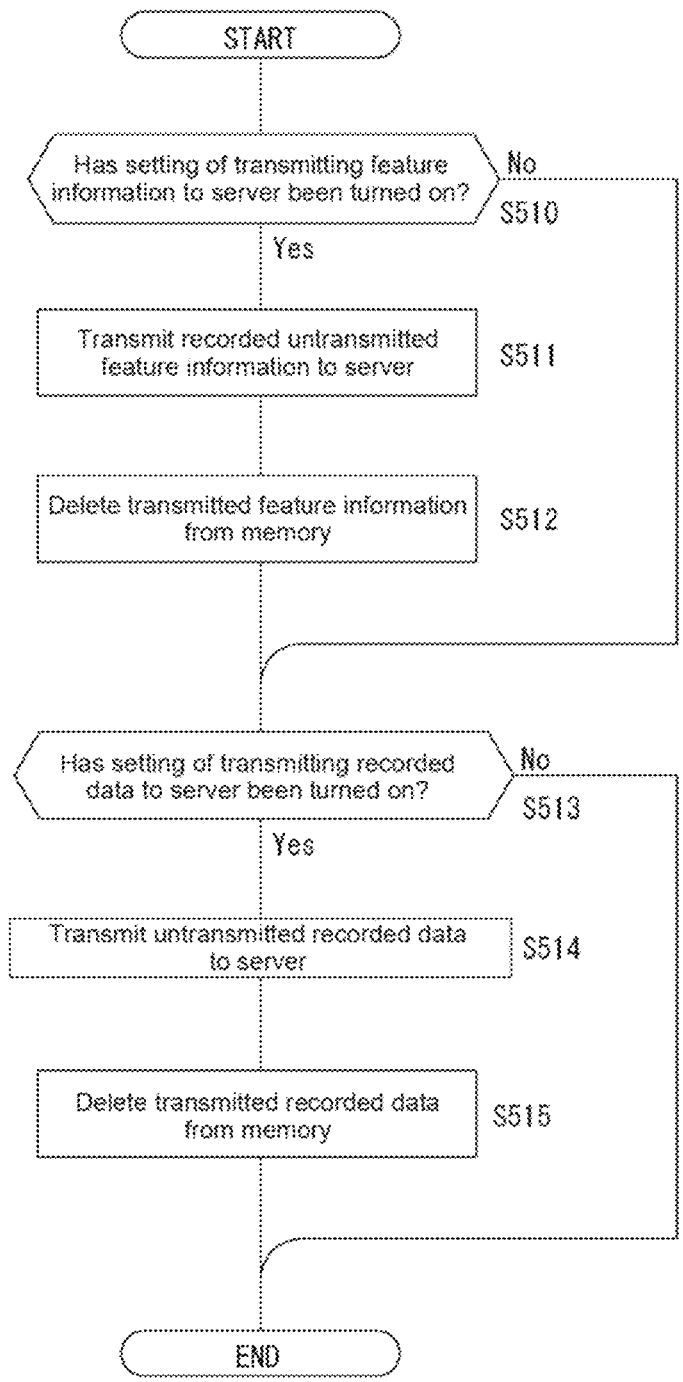
FIG. 21 is a flowchart illustrating an example of processing related to transmission of the feature information and a captured image in the normal mode.

FIGS. 20 and 21 are flowcharts used to describe processing performed by the image-capturing apparatus 1 in the normal mode. FIG. 20 illustrates processing related to recording of feature information, and FIG. 21 illustrates processing related to transmission of the feature information and a captured image.

The processing of FIG. 20 is performed by the computing section 18, and the processing of FIG. 21 is performed by the controller 23.

In FIG. 20, the computing section 18 determines, in Step S501, whether the target class has been specified. In other words, the computing section 18 determines whether the above-described target class such as a person or a vehicle has been specified. When no target class has been specified, the computing section 18 performs processing using a default class (such as the "person") as the target class in Step S502, and moves on to Step S503. On the other hand, when the target class has been specified, the computing section 18 skips the process of Step S502, and moves on to Step S503.

In Step S503, the computing section 18 waits until the target class has been detected in an image. In other words, processing that includes detecting a candidate object in an image for a current frame and recognizing a region of the object is performed by the processing described above being performed by the object region recognizing section 82, and class identification is performed with respect to the detected object by the processing described above being performed by the class identification section 83. Then, it is continuously determined whether the target class is included in identified classes, until a determination result showing that the target class is included is obtained.

When a determination result showing that the target class has been detected, has been obtained in Step S503, the computing section 18 performs, in Step S504, processing of detecting feature information with respect to the target class. In other words, feature information regarding a subject that is the target class is detected by the processing described above being performed by the feature detector 85.

Here, an ID of a detection-target target class is associated with the detected feature information. In this example, the computing section 18 assigns the ID (hereinafter referred to as a "subject ID") to a detected target class every time a new target class is detected in an image. Then, in response to detecting the feature information in Step S504, the computing section 18 associates a subject ID of a detection-target target class with the detected feature information.

In Step S505, which is subsequent to Step S504, the computing section 18 performs, as processing of recording feature information, processing of recording (storing), in the memory 16, the feature information (with which a subject ID is associated) detected in Step S504.

Note that it is desirable that, when the feature information is recorded, information such as a time stamp that is used to manage the synchronization with a captured image be attached to the feature information, such that the feature information is temporally synchronized with data of the captured image.

In Step S506, which is subsequent to Step S505, the computing section 18 determines whether the target class has disappeared from the image. When the target class has not disappeared from the image, the computing section 18 returns to Step S504. Consequently, detection of feature information regarding a target class and recording of the feature information in a memory are repeated as long as the target class is continuously detected in an image. Here, there is no need to repeatedly perform detection and recording with respect to feature information regarding the above-described attributes of a subject, such as height, gender, a color of a vehicle, and a vehicle type such as a standard-sized vehicle or a large-sized vehicle. On the other hand, the repeated detection and recording are effective with respect to feature information regarding the movement of a subject (such as information regarding a location of the subject).

When the computing section 18 has determined, in Step S506, that the target class has disappeared from the image, the computing section 18 terminates the series of processes illustrated in FIG. 20.

Subsequently, the processing of FIG. 21 is described.

First, the controller 23 determines, in Step S510, whether a setting of transmitting feature information to a server (the cloud server 3) is on. When the transmission setting is on, the controller 23 moves on to Step S511, and performs processing of transmitting recorded untransmitted feature information to the server. Here, a transmission destination of the feature information may be the fog server 2. In this case, in response to receiving the feature information from the image-capturing apparatus 1, the fog server 2 transmits the received feature information to the cloud server 3. Alternatively, the transmission destination of the feature information may be the cloud server 3. In this case, the fog server 2 transmits, to the cloud server 3, the feature information received from the image-capturing apparatus 1, on the basis of information regarding the transmission destination.

In Step S512, which is subsequent to Step S511, the controller 23 performs processing of deleting the transmitted feature information from the memory 16, and moves on to Step S513.

On the other hand, when the controller 23 has determined, in Step S510, that the setting of transmitting feature information is not on, the controller 23 skips the processes of Steps S511 and S512, and moves on to Step S513.

In Step S513, the controller 23 determines whether a setting of transmitting recorded data to the server is on. In other words, the controller 23 determines whether a setting of transmitting, to the cloud server 3, an encrypted captured image recorded in the memory 16 is on.

When the setting of transmitting recorded data is on, the controller 23 moves on to Step S514, and performs processing of transmitting untransmitted feature information to the server. A transmission method that is similar to the method for transmitting feature information in Step S511 described above is adopted here. Consequently, untransmitted data of the encrypted captured image recorded in the memory 16 is transmitted to the cloud server 3.

Subsequently, in Step S515, the controller 23 performs processing of deleting the transmitted recorded data from the memory 16, and terminates the series of processes illustrated in FIG. 21.

Further, the controller 23 has determined, in Step S513, that the setting of transmitting recorded data is not on, the controller 23 skips the processes of Steps S514 and S515, and terminates the series of processes illustrated in FIG. 21.

A captured image and feature information that are transmitted from the image-capturing apparatus 1 by the above-described processing in the normal mode being performed are stored in the cloud server 3. A user can view the captured image and the feature information stored as described above by accessing the cloud server 3 using the user terminal 4. Here, software of the user terminal 4 makes it possible to view not only feature information itself, but also statistical data such as the number of people who meet a certain feature condition and a ratio of the person; and an image or the like from which a line of flow is seen.

Note that the example in which a storing destination of an encrypted captured image and feature information is the cloud server 3 has been described above. However, the storing destination may be the fog server 2. Alternatively, the storing destination may be both the fog server 2 and the cloud server 3.

Further, a transmitted encrypted captured image and transmitted feature information do not necessarily have to be deleted from a memory in the image-capturing apparatus 1.

4. Processing Related to Feature Information (Target Search Mode)

4-1. First Example

As an operation mode regarding feature information, the information processing system 100 of the present embodiment has a target search mode that is a mode other than the normal mode described above. The target search mode is a mode in which it is determined whether there exists a target subject on the basis of an image captured by the image-capturing apparatus 1. In other words, the target search mode is a mode in which a target subject is searched in an image-capturing field of view.

There are various applications of the target search mode. The target search mode may be applied to a person finding in an image-capturing-target location, which is a typical example of the applications of the target search mode. For example, the following function may be provided by applying the target search mode to a search for a shoplifter in a certain store when shoplifting occurs in the store. When the shoplifter visits the store again and an image of the shoplifter is captured, a user is notified of this matter.

Alternatively, the following function may be provided by applying the target search mode to a search for a specific vehicle in a traffic monitoring system, which is another application of the target search mode. Specifically, when an image of the specific vehicle is captured, a user is notified of this matter.

Here, in the present embodiment, each image-capturing apparatus 1 includes the feature detector 85. In other words, each image-capturing apparatus 1 includes a function of detecting feature information regarding a subject detected in a captured image as a target class. From this point of view, a method that includes determining whether there exists a search-target subject on the basis of feature information detected by each image-capturing apparatus 1, is adopted in the present embodiment. Specifically, the determination of whether there exists a search-target subject is performed on the basis of a result of comparing "detected feature information" that is feature information detected by the feature detector 85 with "target feature information" that is feature information regarding a search-target subject.

Note that the "search-target subject" may be hereinafter referred to as a "target subject".

Further, in the present embodiment, the determination section 86 determining whether there exists a target subject on the basis of the "detected feature information" and the "target feature information" is provided to each image-capturing apparatus 1 (refer to FIG. 2). In other words, in the present embodiment, each image-capturing apparatus 1 performs processes until determination of whether there exists a target subject on the basis of specified "target feature information".

Figure 22:
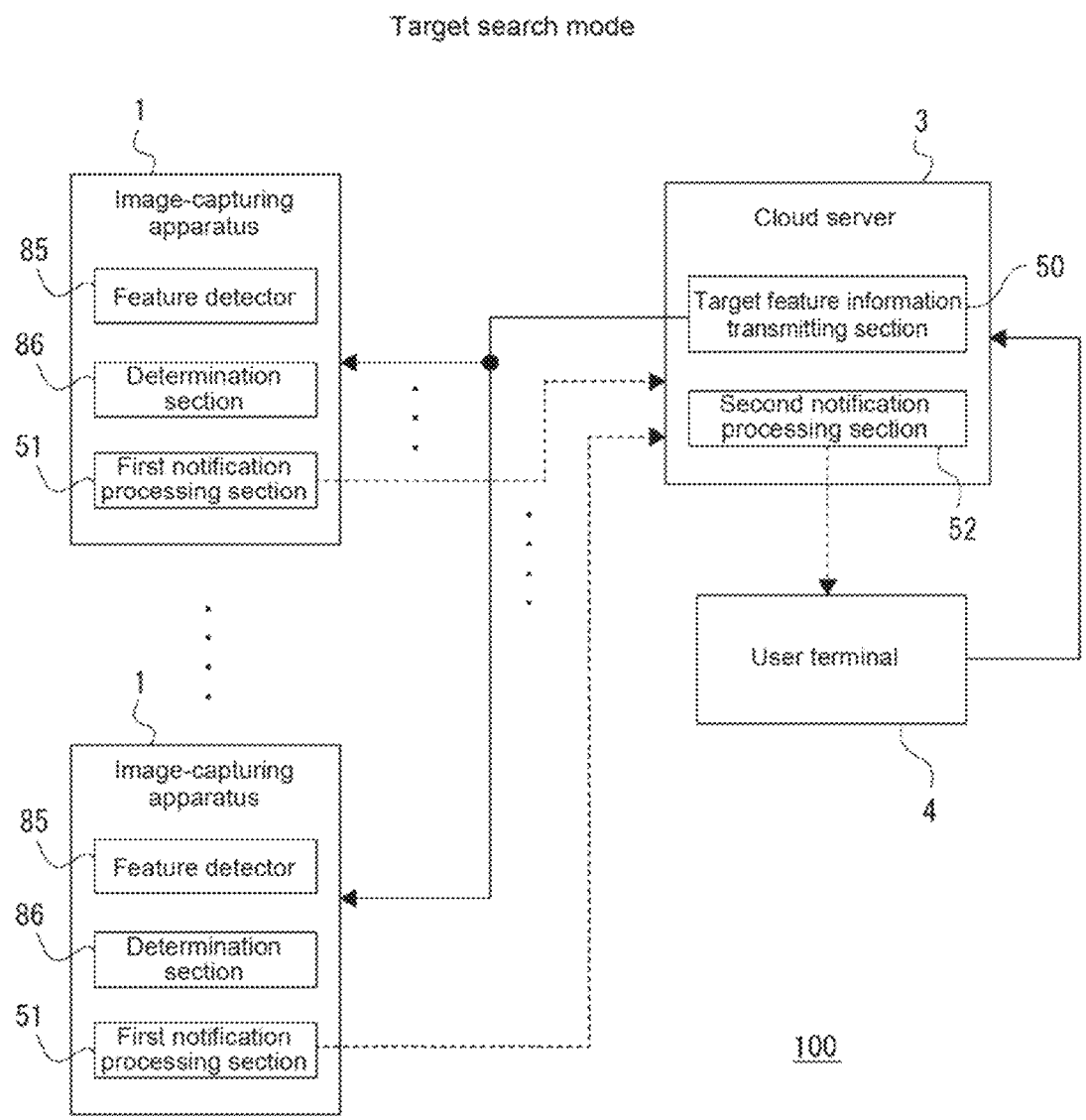
FIG. 22 is a diagram used to describe an operation performed in a target search mode by the information processing system of a first example.

FIG. 22 is a diagram used to describe an operation performed in the target search mode by the information processing system 100 of a first example in which the determination section 86 is provided to each image-capturing apparatus 1, as described above.

As illustrated in the FIGURE, each image-capturing apparatus 1 includes the feature detector 85, the determination section 86, and a first notification processing section 51. Further, the cloud server 3 includes a target feature information transmitting section 50 and a second notification processing section 52.

Note that, in FIG. 22, each image-capturing apparatus 1 and the cloud server 3 actually communicate with one another through the fog server 2 and the network Nt, and the cloud server 3 and the user terminal 4 actually communicate with one another through the network Nt. Here, illustrations of the fog server 2 and the network Nt are omitted for convenience of illustration.

The target feature information transmitting section 50 in the cloud server 3 is one of the functions of the CPU 31 in the cloud server 3, and transmits target feature information to each image-capturing apparatus 1. Here, the target feature information is set on the basis of an operation performed by a user with respect to the user terminal 4.

For example, in the case of the above-described application to a search for a shoplifter, a user may specify a shoplifter while viewing an image captured around an estimated time of occurrence of the shoplifting. In this case, the user terminal 4 receives, from a user, an operation of specifying a subject of a shoplifter (such as a touch operation performed on a screen) when the user views a captured image, and indicates, to the cloud server 3, an ID of the subject (a subject ID) specified by the specifying operation being performed. The cloud server 3 (the CPU 31) transmits feature information associated with the indicated subject ID to each image-capturing apparatus 1 as target feature information using the target feature information transmitting section 50.

Here, all of pieces of feature information each associated with a subject ID may be target feature information, or only a portion of the pieces of feature information may be target feature information. Further, feature information used as "target feature information" may be selected by a user.

Note that the target feature information is not limited to being set on the basis of the operation of specifying a subject, as described above, and may be set on the basis of an operation of specifying feature information that is performed by a user. For example, with respect to feature information such as a number of a vehicle, an operation of inputting the number may be received as an operation of inputting target feature information.

On the basis of "detected feature information" and "target feature information", the determination section 86 of each image-capturing apparatus 1 determines whether there exists a target subject in a captured image, the target subject being a subject for which the detected feature information matches or is similar to the target feature information.

Here, when a plurality of types of pieces of feature information such as gender, age, and a color of clothes is used as target feature information, a state in which pieces of feature information match refers to a state in which pieces of feature information match with respect to all of the plurality of types of pieces of feature information.

Further, when the plurality of types of pieces of feature information is used as target feature information, examples of a state in which pieces of feature information are similar to each other include a state in which pieces of feature information match with respect to a certain number of types of pieces of feature information from among the plurality of types of pieces of feature information, the certain number being a specified number or a number greater than the specified number (except for the state in which pieces of feature information match with respect to all of the plurality of types of pieces of feature information), a state in which the degree of similarity in feature information is a certain degree or a degree greater than the certain degree with respect to all of the plurality of types of pieces of feature information, and a state in which the degree of similarity in feature information is a certain degree or a degree greater than the certain degree with respect to a certain number of types of pieces of feature information, the certain number being a specified number or a number greater than the specified number.

As described above, the determination processing performed by the determination section 86 is determination of whether "detected feature information" and "target feature information" match, or determination based on the degree of similarity.

The first notification processing section 51 transmits a notification signal to the cloud server 3 in response to a determination result showing that there exists a target subject being obtained by the determination section 86. This processing performed by the first notification processing section 51 is performed by the controller 23 on the basis of the determination result obtained by the determination section 86.

The second notification processing section 52 in the cloud server 3 transmits a notification signal to the user terminal 4 in response to the notification signal transmitted by the first notification processing section 51 being received, that is, in response to a signal that indicates the determination result showing that there exists a target subject, being received. This processing performed by the second notification processing section 52 is performed by the CPU 31 in the cloud server 3.

In response to the communication signal being received from the second notification processing section 52, the user terminal 4 performs processing of giving a notification to a user. Accordingly, the user is notified of the appearance of a search-target subject.

Figure 23:
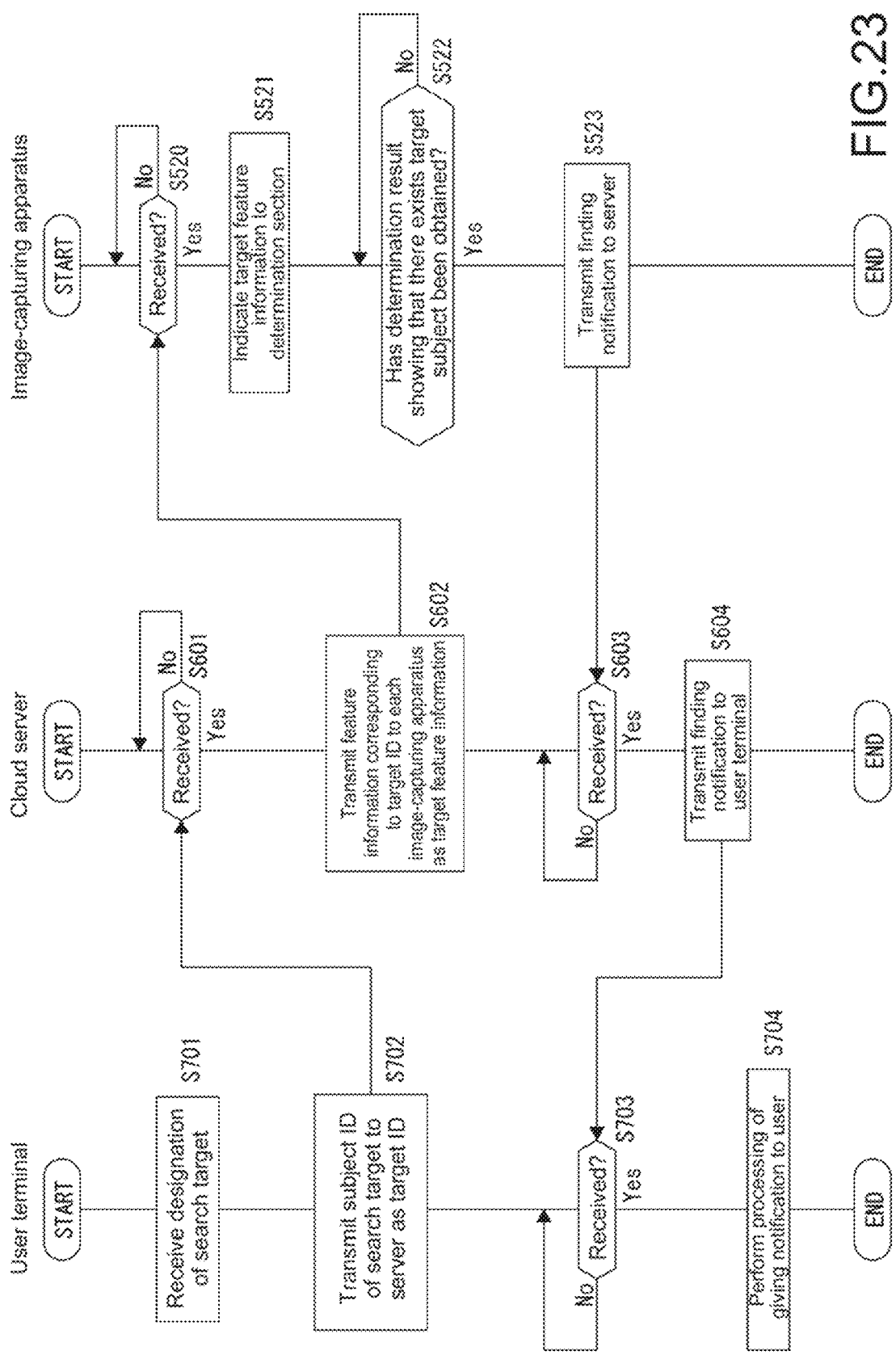
FIG. 23 is a flowchart illustrating an example of a specific procedure of processing to be performed in the target search mode by the information processing system of the first example.

FIG. 23 is a flowchart illustrating an example of a specific procedure of processing to be performed in the target search mode by the information processing system 100 of the first example. Note that, in FIG. 23, the processing performed by the user terminal 4 and the processing performed by the cloud server 3 are respectively performed by the CPU 31 of the user terminal 4 and the CPU 31 of the cloud server 3. Further, the processing performed by the image-capturing apparatus 1 is performed by the controller 23.

In FIG. 23, first, the user terminal 4 receives a designation of a search target in Step S701. For example, the user terminal 4 receives the operation of specifying a subject using, for example, the touch operation performed on a screen, as described above.

Subsequently, in Step S702, the user terminal 4 transmits a subject ID of a search target to the server as a target ID. In other words, the user terminal 4 performs processing of transmitting, to the cloud server 3 and as a target ID, a subject ID of the subject specified by the specifying operation received in Step S701 being performed.

In Step S601, the cloud server 3 waits for the target ID to be received from the user terminal 4. When the target ID has been received, the cloud server 3 performs, in Step S602, processing of transmitting feature information that corresponds to the target ID to each image-capturing apparatus 1 as target feature information.

In Step S520, the image-capturing apparatus 1 (the controller 23) waits for the target feature information to be received from the cloud server 3. When the target feature information has been received, the image-capturing apparatus 1 performs, in Step S521, processing of indicating the target feature information to the determination section 86.

The determination section 86 to which the target feature information has been indicated performs processing of determining whether there exists a target subject on the basis of detected feature information detected by the feature detector 85, and the target feature information, as described above.

In response to performing the processing of indicating the target feature information in Step S521, the image-capturing apparatus 1 waits, in Step S522, until a determination result showing that there exists the target subject is obtained. When the determination result showing that there exists the target subject has been obtained by the determination section 86, the image-capturing apparatus 1 moves on to Step S523 to transmit a finding notification to the server (the cloud server 3), and terminates the series of processes illustrated in FIG. 23.

In Step S603, which is subsequent to Step S602 described above, the cloud server 3 waits for the finding notification transmitted in Step S523 to be received. When the finding notification has been received, the cloud server 3 performs processing of transmitting the finding notification to the user terminal 4 in Step S604, and terminates the series of processes illustrated in FIG. 23.

In Step S703, which is subsequent to Step S702 described above, the user terminal 4 waits for the finding notification to be received from the cloud server 3. When the finding notification has been received, the user terminal 4 performs processing of giving a notification to a user in Step S704, and terminates the series of processes illustrated in FIG. 23.

Here, the notification processing in Step S704 may be, for example, processing of outputting image information used to give a notification using a display or processing of outputting notification sound using a speaker, the output processing being performed by the output section 37.

4-2. Second Example

Figure 24:
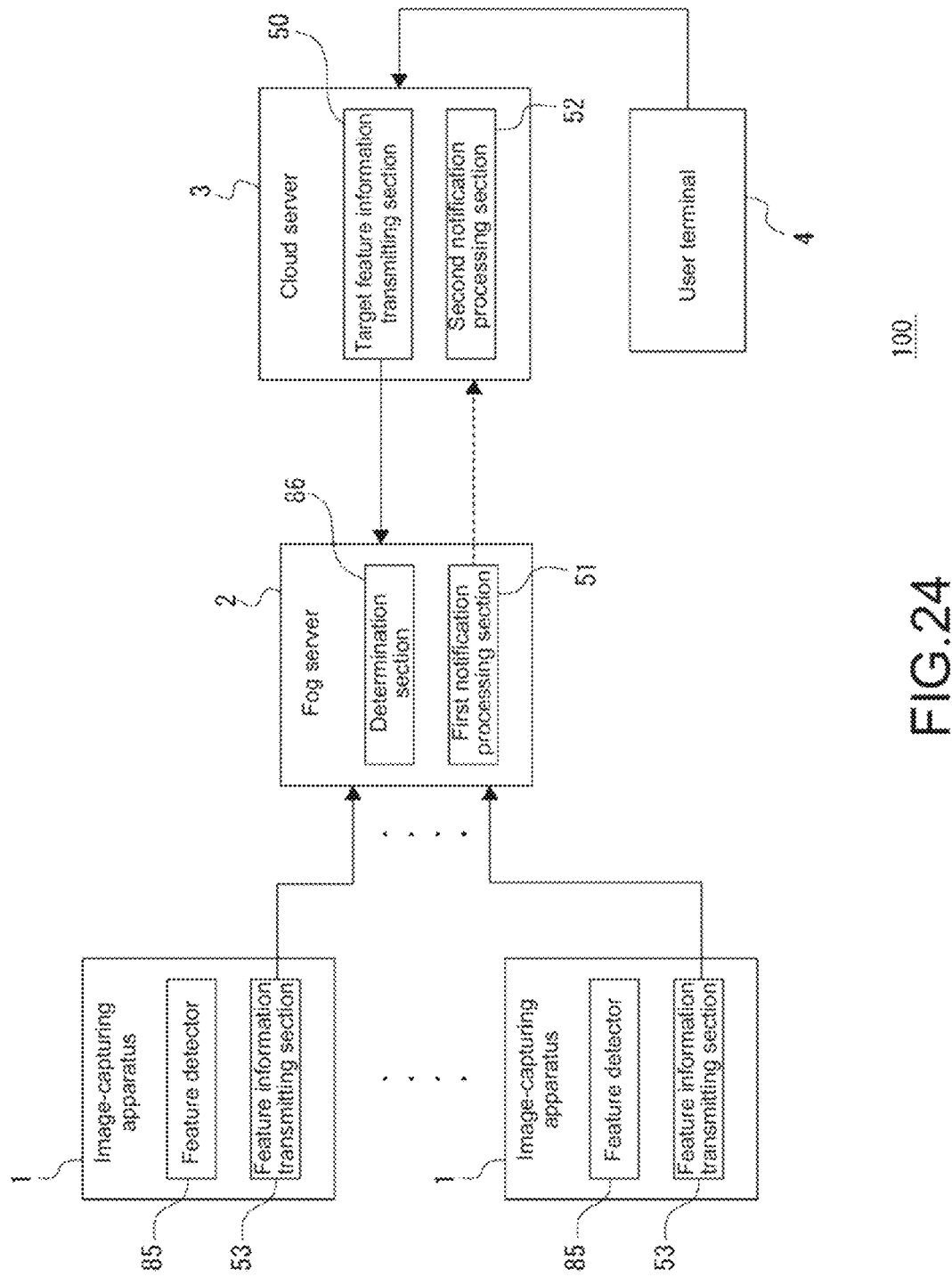
FIG. 24 is a diagram used to describe a functional configuration of the information processing system of a second example in the target search mode, and an operation performed in the target search mode by the information processing system of the second example.

FIG. 24 is a diagram used to describe a functional configuration of the information processing system 100 of a second example in the target search mode, and an operation performed in the target search mode by the information processing system 100 of the second example. Note that, in the following description, a portion similar to the already described portion is denoted by a reference numeral or a step number that is similar to the reference numeral or the step number of the already described portion, and a description thereof is omitted.

In the second example, the determination section 86 is provided to the fog server 2. In other words, the fog server 2 determines whether there exists a target subject on the basis of detected feature information transmitted from each image-capturing apparatus 1.

Thus, each image-capturing apparatus 1 of the second example includes the feature detector 85 and a feature information transmitting section 53 that transmits feature information detected by the feature detector 85 to the fog server 2.

Further, in this case, the target feature information transmitting section 50 in the cloud server 3 transmits target feature information to the fog server 2.

Figure 25:
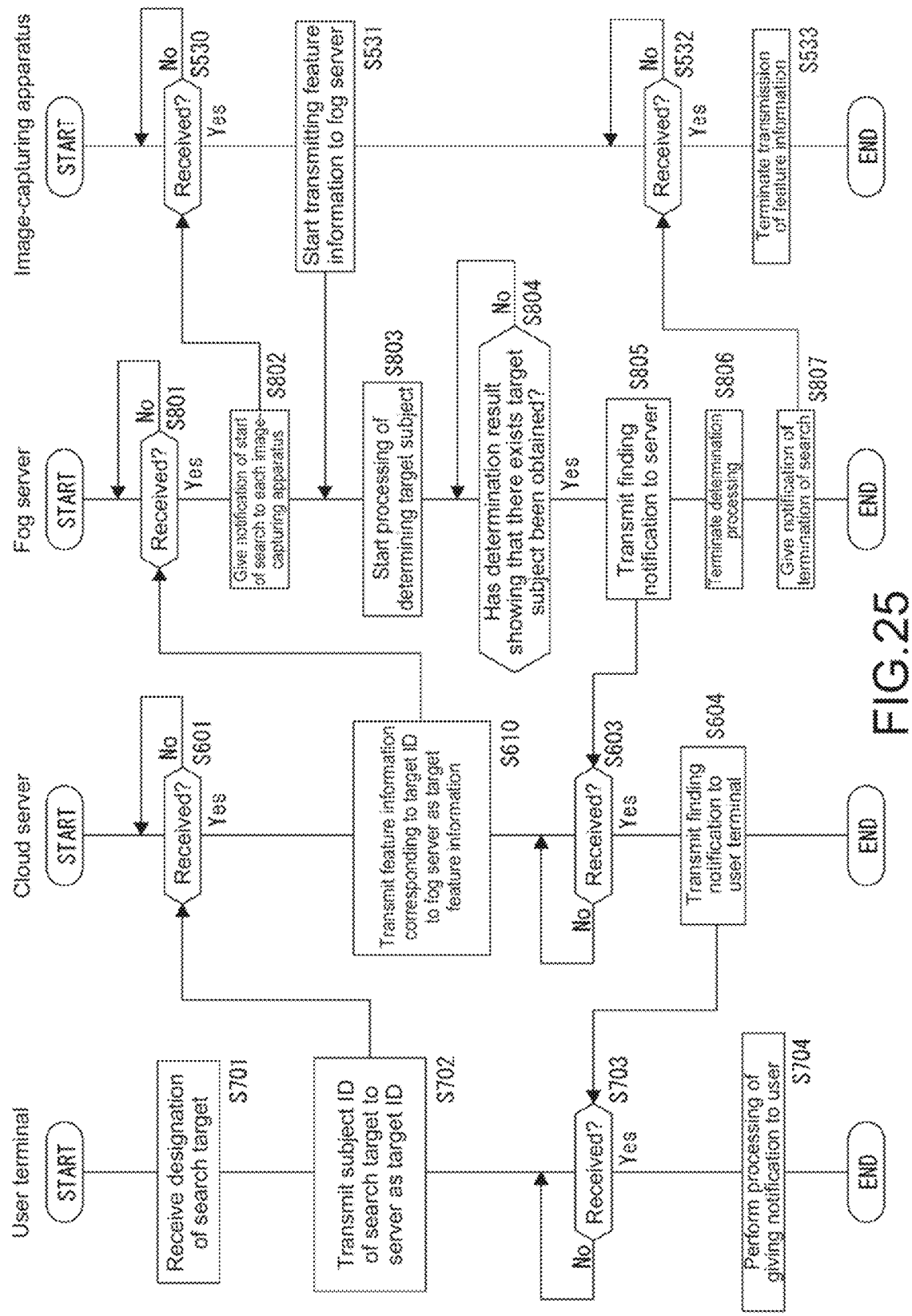
FIG. 25 is a flowchart illustrating an example of a specific procedure of processing to be performed in the target search mode by the information processing system of the second example.

FIG. 25 is a flowchart illustrating an example of a specific procedure of processing to be performed in the target search mode by the information processing system 100 of the second example. Note that, in FIG. 25, the processing performed by the fog server 2 is performed by the CPU 31 of the fog server 2.

Processing performed by the user terminal 4 is similar to the processing being performed by the user terminal 4 and illustrated in FIG. 23. Thus, the description is not made repeatedly.

In this case, in response to receiving a target ID from the user terminal 4 in Step S601, the cloud server 3 performs, in Step S610, processing of transmitting feature information that corresponds to the target ID to the fog server 2 as target feature information.

In Step S801, the fog server 2 waits for the target feature information to be received from the cloud server 3. When the target feature information has been received, first, the fog server 2 gives a notification of a start of a search to each image-capturing apparatus 1 in Step S802.

In Step S530, the image-capturing apparatus 1 waits for the notification of a start of a search to be received. When the notification of a start of a search has been received, the image-capturing apparatus 1 starts transmitting feature information to the fog server 2 in Step S531. In other words, the image-capturing apparatus 1 starts performing processing of transmitting feature information detected by the feature detector 85 to the fog server 2.

In Step S803, which is subsequent to Step S802, the fog server 2 starts performing processing of determining whether there exists a target subject on the basis of feature information (detected feature information) transmitted from each image-capturing apparatus 1, and on the basis of the target feature information received in Step S801. In other words, the fog server 2 starts performing processing of determining whether there exists the target subject.

In Step S804, which is subsequent to Step S803, the fog server 2 waits until a determination result showing that there exists the target subject is obtained. When the determination result showing that there exists the target subject has been obtained, the fog server 2 gives a finding notification to the server (the cloud server 3) in Step S805. Subsequently, in Step S806, the fog server 2 terminates the determination processing started in Step S803 described above, gives a notification of a termination of a search to each image-capturing apparatus 1 in Step S807, and terminates the series of processes illustrated in FIG. 25.

When the image-capturing apparatus 1 has received the notification of a termination of a search being given in Step S807, the image-capturing apparatus 1 terminates the transmission of feature information to the fog server 2, and terminates the series of processes illustrated in FIG. 25 (refer to Steps S532 and S533).

In Step S603, which is subsequent to Step S610 described above, the cloud server 3 waits for the finding notification transmitted in Step S805 to be received. When the finding notification has been received, the cloud server 3 moves on to Step S604 to transmit the finding notification to the user terminal 4, and terminates the series of processes illustrated in FIG. 25.

Here, when the fog server 2 includes the determination section 86, this results in there being no need for the image-capturing apparatus 1 to perform processing of determining whether there exists a target subject.

This results in a reduction in the processing load of the image-capturing apparatus 1. This makes it possible to scale down a circuit of the image-capturing apparatus 1 and to make the circuit smaller in size. Such a configuration is suitable when there is a need to make the image-capturing apparatus 1 smaller for the purpose of applying the image-capturing apparatus 1 to, for example, a surveillance camera.

On the other hand, when each image-capturing apparatus 1 includes the determination section 86 as in the first example, the processing load imposed to determine whether there exists a target subject, is distributed to the respective image-capturing apparatuses 1. This makes it possible to reduce the processing load of an information processing apparatus that is the fog server 2. Further, there is no need for transmission of feature information from the image-capturing apparatus 1 to an information processing apparatus, and this makes it possible to reduce a volume of communication data.

The example of providing the determination section 86 to the fog server 2 has been described above. However, the determination section 86 can also be provided to the cloud server 3.

4-3. Third Example

Figure 26:
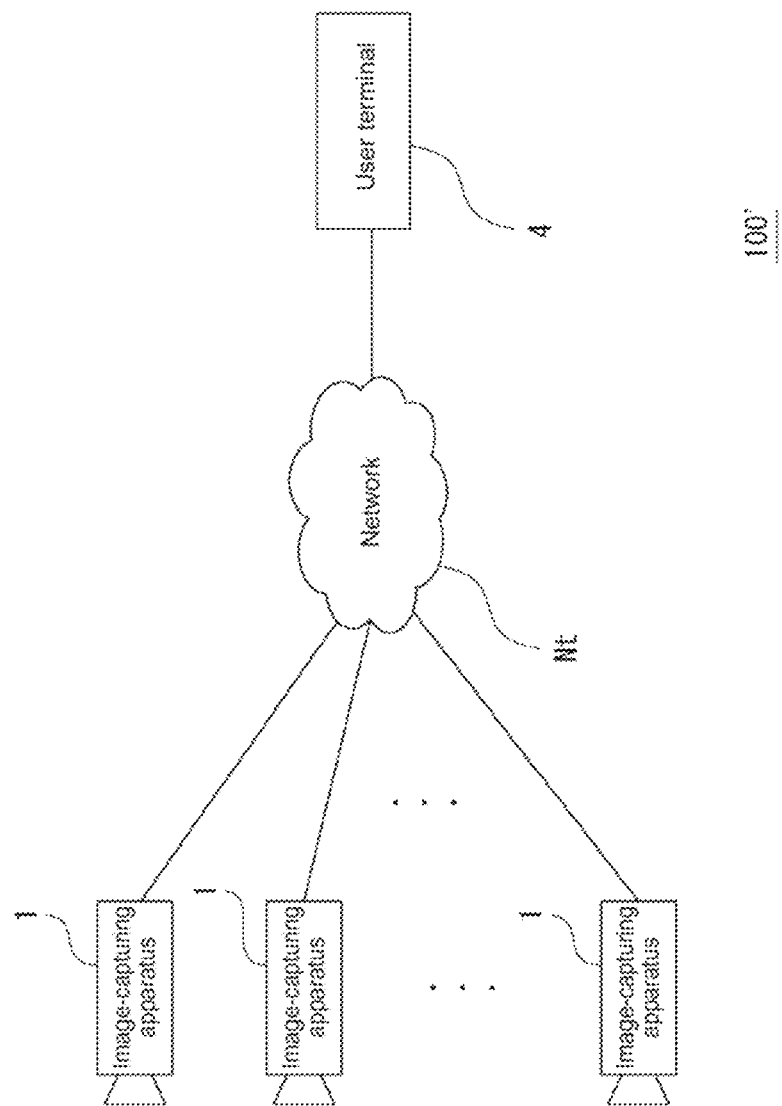
FIG. 26 is a block diagram schematically illustrating an example of a configuration of an information processing system of a third example.

FIG. 26 is a block diagram schematically illustrating an example of a configuration of an information processing system 100' of a third example.

As illustrated in the FIGURE, the information processing system 100' of the third example includes a plurality of image-capturing apparatuses 1 and the user terminal 4, where the fog server 2 and the cloud server 3 illustrated in FIG. 1 are omitted. Each image-capturing apparatus 1 in this case can communicate data to the user terminal 4 through the network Nt.

Figure 27:
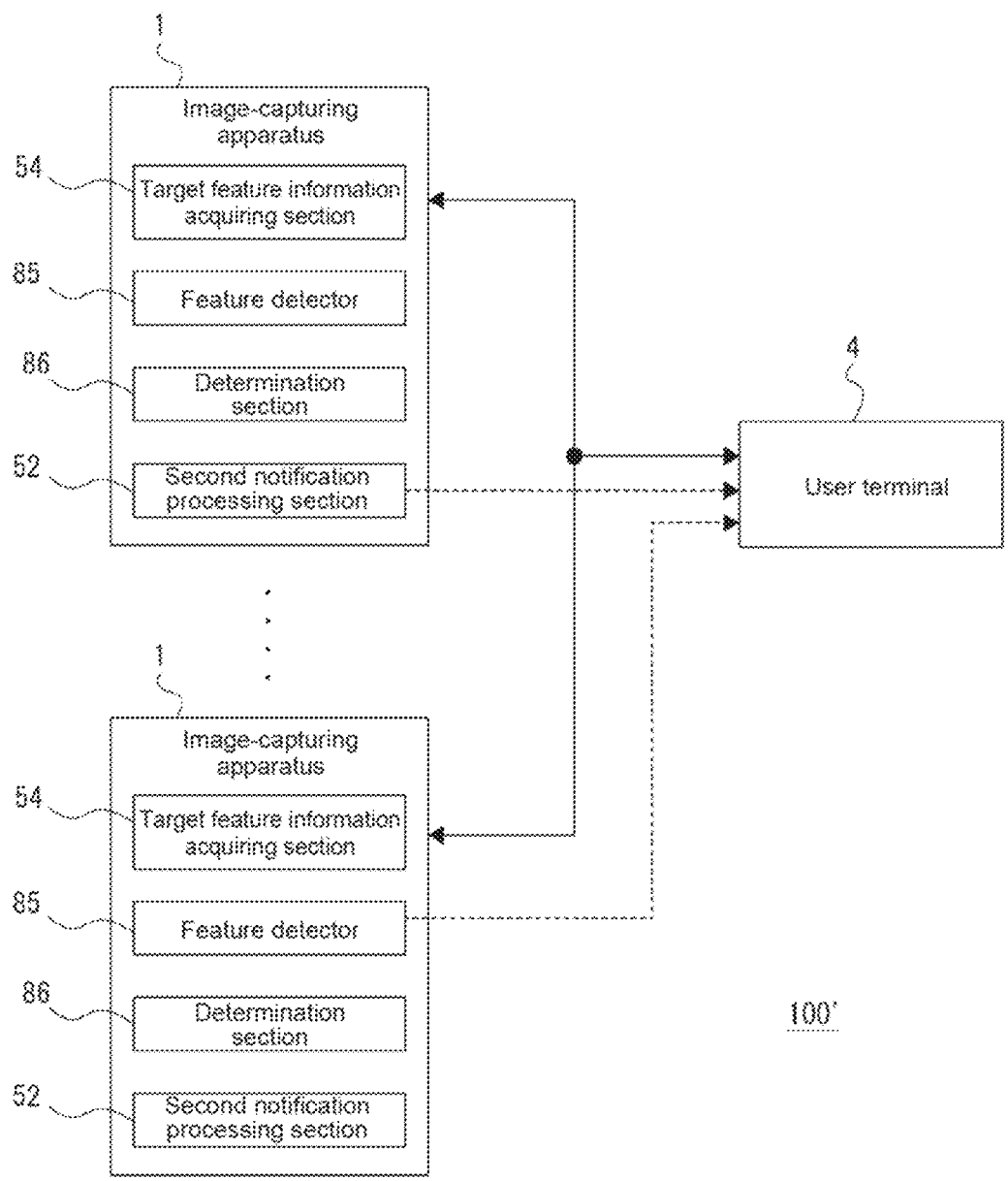
FIG. 27 is a diagram used to describe a functional configuration of the information processing system of the third example in the target search mode, and an operation performed in the target search mode by the information processing system of the third example.

FIG. 27 is a diagram used to describe a functional configuration of the information processing system 100' of the third example in the target search mode, and an operation performed in the target search mode by the information processing system 100' of the third example.

Also in the third example, the user terminal 4 specifies a subject ID of a search-target subject on the basis of an operation performed by a user.

Each image-capturing apparatus 1 in this case includes a target feature information acquiring section 54 that acquires target feature information on the basis of the subject ID of a search target (a target ID) that is specified by the user terminal 4, as described above. The image-capturing apparatus 1 in this case keeps on holding feature information detected in the past, and the target feature information acquiring section 54 acquires, as target feature information, a piece of feature information that is from among pieces of feature information held as described above, and is associated with a target ID.

Note that, also in this case, the user terminal 4 can directly receive a designation of feature information of a target subject, instead of a designation of a target ID. In this case, the target feature information acquiring section 54 in the image-capturing apparatus 1 receives and acquires, as target feature information, feature information specified by the user terminal 4.

In this case, the determination section 86 in each image-capturing apparatus 1 determines whether there exists a target subject on the basis of the target feature information acquired by the target feature information acquiring section 54, and on the basis of feature information detected by the feature detector 85.

Further, each image-capturing apparatus 1 in this case includes the second notification processing section 52. In response to a determination result showing that there exists the target subject being obtained by the determination section 86, the second notification processing section 52 outputs a notification signal to the user terminal 4.

Examples of a system that notifies the user terminal 4 of the appearance of a target subject, as described above, may include a system in which there is no involvement of the fog server 2 and the cloud server 3.

Note that, in the configuration of the information processing system 100' illustrated in FIG. 26, the user terminal 4 may include the determination section 86. In this case, the feature information transmitting section 53 is provided to the image-capturing apparatus 1, and feature information detected by the feature detector 85 is transmitted to the user terminal 4, as in the case of FIG. 24.

5. Modifications

Note that the embodiments are not limited to the specific examples described above, and various modifications may be made thereto.

For example, with respect to the method for encrypting a signal read from a pixel of the array sensor 12 and the method for encrypting a target region, the example in which photoelectric random numbers are used for encryption has been described above. However, with respect to these methods, random numbers used for encryption are not limited to photoelectric random numbers. For example, pseudorandom numbers may be used. Alternatively, when true random numbers are used, a method that includes detecting, using a corresponding sensor, a natural phenomenon that is substantially not predictable or reproducible, such as a change in, for example, heat or sound; and generating random numbers on the basis of values obtained by the detection.

Further, it is assumed, in the description above, that feature information is not encrypted. However, the feature information may be encrypted. Specifically, examples of the encryption of feature information may include encrypting feature information transmitted from the image-capturing apparatus 1 to the fog server 2 in the normal mode. Alternatively, the examples of the encryption of feature information may include encrypting feature information transmitted from the image-capturing apparatus 1 to an external apparatus in the target search mode when there is a need for the transmission of the feature information from the image-capturing apparatus 1 to the external apparatus, as in the second example (refer to FIG. 24).

The encryption of feature information may be performed on the basis of photoelectric random numbers. Alternatively, the encryption may be performed on the basis of pseudo-random numbers.

Further, it may be determined whether there exists a target subject on the basis of one of information regarding a feature with a high degree of abstraction and information regarding a feature with a low degree of abstraction, although this has not specifically been described above. Examples of the determination performed only on the basis of the information regarding a feature with a high degree of abstraction may include determining whether pieces of feature information match with respect to gender and height. Further, examples of the determination performed only on the basis of the information regarding a feature with a low degree of abstraction may include determining whether pieces of feature information (feature amounts) regarding a face are similar to each other.

The example in which the determination section 86 is not provided to the image-capturing apparatus 1, but is provided to the cloud server 3 has been described above. In this case, the cloud server 3 can also determine whether there exists a target subject on the basis of past feature information received by the cloud server 3 from the image-capturing apparatus 1 to be stored in the cloud server 3.

For example, a user performs an operation on the user terminal 4, the operation being performed to perform indication to the cloud server 3 to specify a date, a period of time, and target feature information that are determination targets. The cloud server 3 searches for an ID of a subject for which feature information matches or is similar to the specified target feature information, on the basis of a piece of feature information that is from among stored pieces of feature information and is detected at the specified date or for the specified period of time. In this case, the target feature information may be only the information regarding a feature with a high degree of abstraction, or may be only the information regarding a feature with a low degree of abstraction, or may be a combination thereof.

Further, when it has been determined that there exists a target subject, information regarding the target subject is presented to a user. The presented information is not limited to an ID of a corresponding subject, and, for example, the number of corresponding subjects (such as the number of people) or an image of a corresponding subject may be presented.

Note that, in the target search mode, the image-capturing apparatuses 1 of a plurality of image-capturing apparatuses 1 are not likely to simultaneously find a target subject (give a finding notification) when the respective image-capturing apparatuses 1 are placed in locations situated sufficiently away from each other, such as different countries or regions.

However, when, for example, the accuracy in determination performed by the determination section 86 (that is, the accuracy in detecting a target subject) is low, the image-capturing apparatuses 1 of a plurality of image-capturing apparatuses 1 may simultaneously give respective finding notifications regarding the same person corresponding to the target subject.

Alternatively, when the target subject is, for example, a one-of-a-kind work of art, and when a counterfeit (a fake) of the work of art has been coming onto the market, the image-capturing apparatuses 1 of a plurality of image-capturing apparatuses 1 may simultaneously give respective finding notifications regarding the work of art corresponding to the target subject.

Thus, in order to make it possible to determine whether such an anomaly due to the accuracy in detecting a target subject, or such an anomaly due to an object corresponding to a target subject has occurred, a configuration of an information processing system 100A described below may be adopted.

Figure 28:
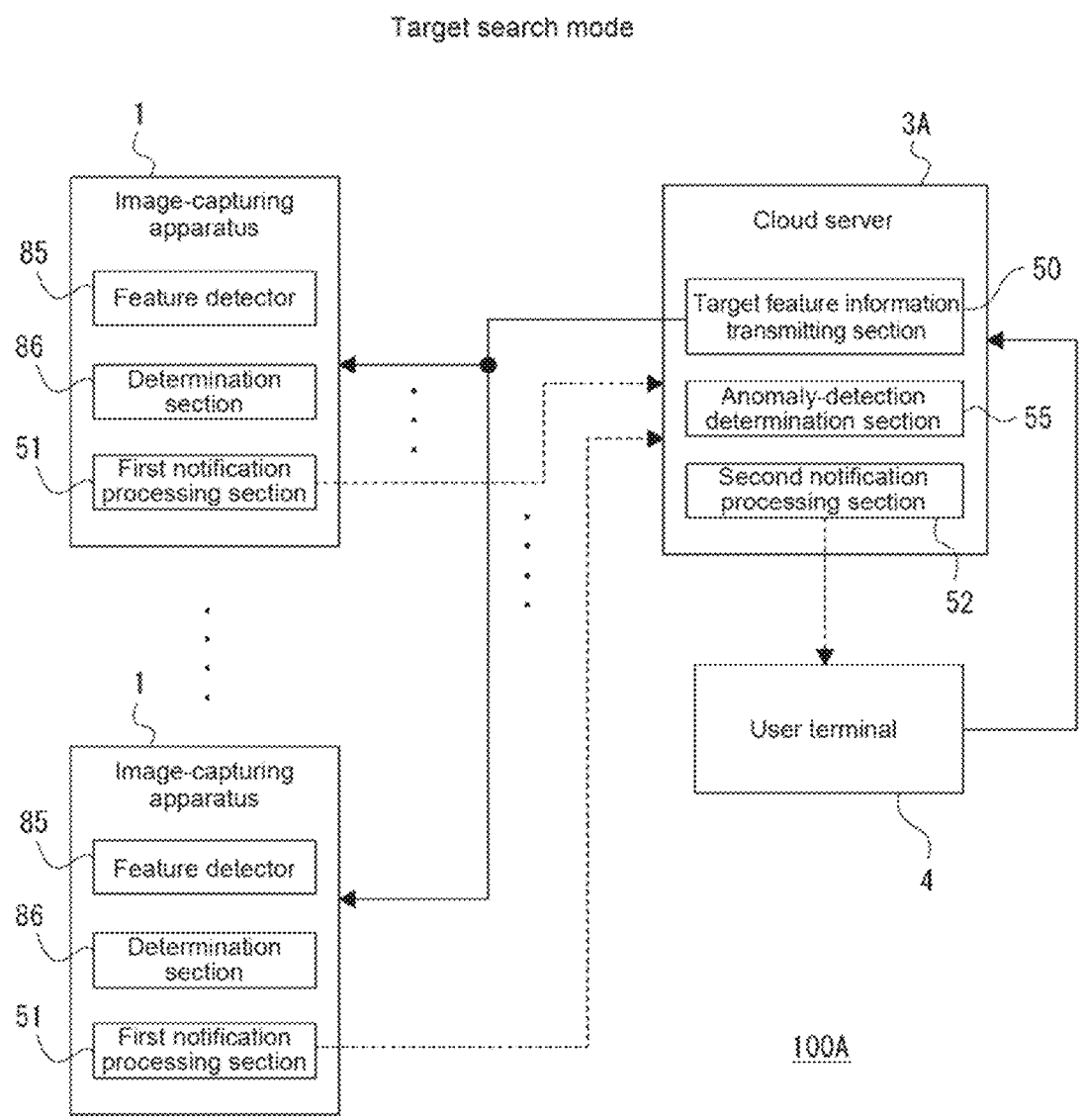
FIG. 28 is a diagram used to describe a functional configuration of the information processing system of a modification with respect to a determination of a detection of an anomaly in a target subject.

FIG. 28 is a diagram used to describe a functional configuration of the information processing system 100A.

The information processing system 100A is different from the information processing system 100 illustrated in FIG. 22 in including a cloud server 3A instead of the cloud server 3.

The cloud server 3A is different from the cloud server 3 in including a function corresponding to an anomaly-detection determination section 55 in addition to the function corresponding to the target feature information transmitting section 50 and the second notification processing section 52 described above.

On the basis of a result of determination performed by the determination section 86, the anomaly-detection determination section 55 determines whether the target subject has been detected in captured images at respective timings that are not physically probable, the captured images being captured by the image-capturing apparatuses 1 being different from each other.

Here, "being detected at a timing that is not physically probable" refers to a state in which, when a target subject has been detected in images respectively captured by two image-capturing apparatuses 1, a time difference in target-subject detection between the two image-capturing apparatuses 1 is smaller than a shortest time necessary for an object corresponding to the target subject to move between locations at which the two image-capturing apparatuses 1 are respectively placed.

Such a determination makes it possible to appropriately determine whether an anomaly due to the accuracy in detecting a target subject, or an anomaly due to an object corresponding to a target subject has occurred.

Specific processing performed by the anomaly-detection determination section 55 is described with reference to a flowchart of FIG. 29.

In this case, the image-capturing apparatus 1 and the user terminal 4 each perform processing similar to the corresponding processing illustrated in FIG. 23.

The cloud server 3A performs the process of Step S620 after the cloud server 3A has determined, in the determination process of Step S603, that a finding notification has been given by the image-capturing apparatus 1. Specifically, in this example, when it has been determined, in Step S603, that a finding notification has been given, the process of Step S602 is performed in response to the notification process of Step S604 being performed.

In Step S620, the cloud server 3A determines whether finding notifications have been given by the plurality of image-capturing apparatus 1 at respective timings that are not physically probable.

Here, the following are two kinds of examples of a specific method for the determination performed in Step S620.

A first method is a method including setting, to be a fixed value, a threshold time used to estimate whether the timing is not physically probable. Specifically, first, it is determined whether the image-capturing apparatuses 1 of a plurality of image-capturing apparatuses 1 each have given a finding notification with respect to the same target subject within a specified period of time in the past (=a threshold time: for example, a fixed value such as one hour). When there exist corresponding image-capturing apparatuses 1, it is determined whether a distance between locations at which the corresponding image-capturing apparatuses 1 are respectively placed is greater than a specified distance (for example, 500 kilometers). When it has been determined, as a result of the determination, that the distance is less than or equal to the specified distance, a negative result is obtained as a result of the determination performed in Step S620 (that is, the finding notification has not been given at a timing that is not physically probable). On the other hand, when it has been determined that the distance is greater than the specified distance, a positive result is obtained as the result of the determination performed in Step S620.

A second method is a method including variably setting the threshold time described above according to the distance between the placement locations. First, it is determined whether the image-capturing apparatuses 1 of a plurality of image-capturing apparatuses 1 each have given a finding notification with respect to the same target object within a sufficiently long target period of time, such as in the last 24 hours. When there exist corresponding image-capturing apparatuses 1, the distance between locations at which the corresponding image-capturing apparatuses 1 are respectively placed is obtained, and a time difference between timings at which finding notifications were respectively given by the corresponding image-capturing apparatuses 1 (hereinafter referred to as a "notification-time difference") is obtained. The threshold time is set on the basis of the obtained distance between the placement locations. A time that is shorter than a shortest time necessary for an object corresponding to a target subject to move the obtained distance between the placement locations, is set to be the threshold time. Then, it is determined, using the threshold time set as described above, whether the notification-time difference is less than or equal to the threshold time. When it has been determined that the notification-time difference is greater than the threshold time, a negative result is obtained as a result of the determination performed in Step S620. When it has been determined that the notification-time difference is less than or equal to the threshold time, a positive result is obtained as the result of the determination performed in Step S620.

Note that the method for the determination performed in Step S620 is not limited to the methods described above. For example, when it is assumed that the locations at which the image-capturing apparatuses 1 in any combination are respectively placed are situated sufficiently away from each other, the processing of the determination performed in Step S620 may be processing of determining whether a notification-time difference between the image-capturing apparatuses 1 each having given a finding notification of the same target subject, is less than or equal to a specified period of time. Alternatively, it may be determined, when a certain image-capturing apparatus 1 has given a finding notification, whether another image-capturing apparatus 1 has given a finding notification within a specified period of time since the finding notification was given by the certain image-capturing apparatus 1.

Figure 29:
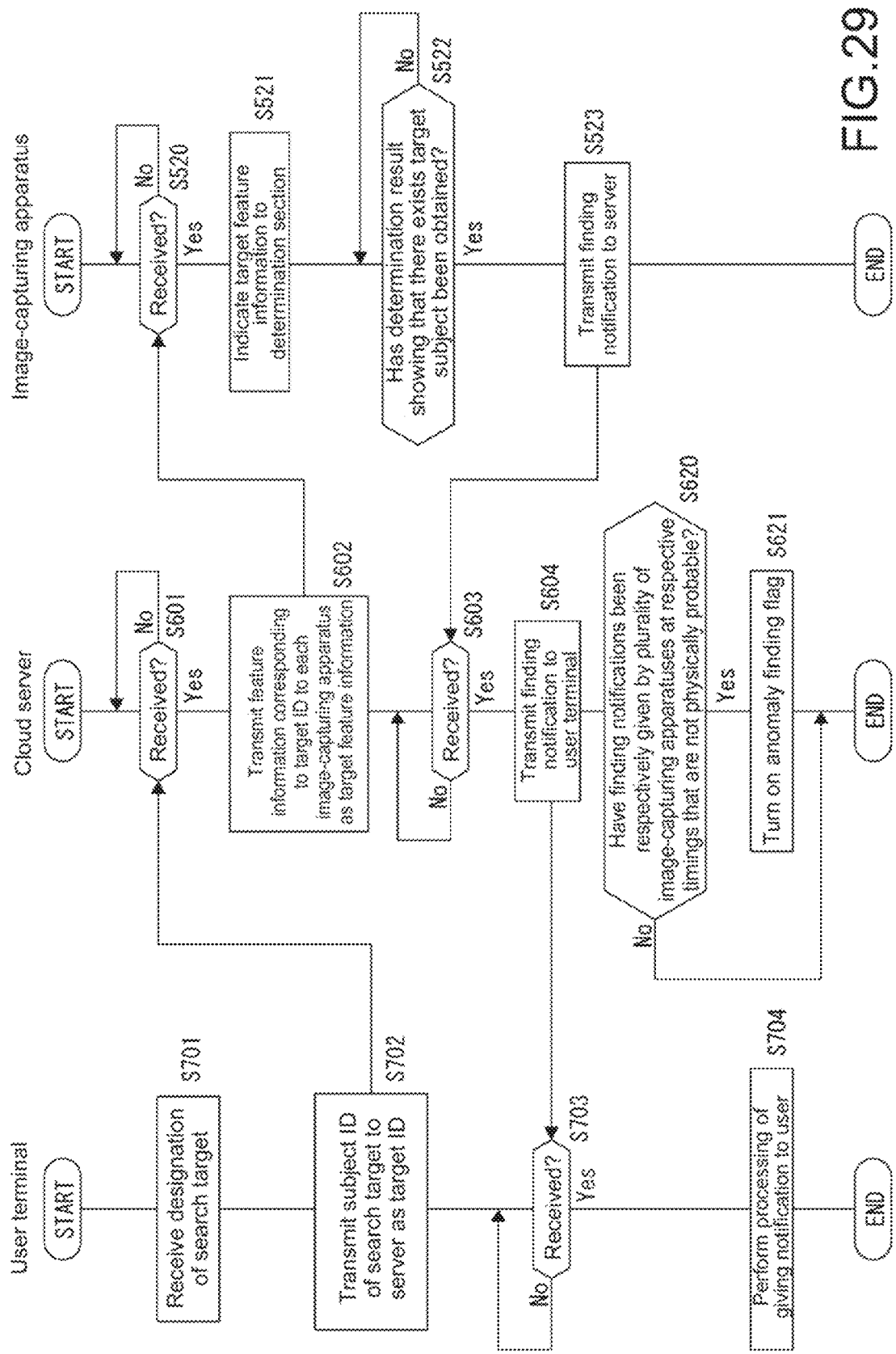
FIG. 29 is a flowchart used to describe processing of determining a detection of an anomaly in a target subject.

When a positive result has been obtained as a result of the determination processing performed in Step S620, the cloud server 3A moves on to Step S621 to turn on an anomaly finding flag, and terminates the series of processes illustrated in FIG. 29. The anomaly finding flag is a flag used to indicate whether an anomaly due to the accuracy in detecting a target subject, or an anomaly due to an object corresponding to a target subject has occurred, where "on" represents the occurrence of an anomaly, and "off" represents an initial value.

On the basis of such an anomaly finding flag, the cloud server 3A can notify (alert), for example, a user of the cloud server 3A or a user of the user terminal 4 that an anomaly has occurred. When the occurrence of an anomaly has been recognized, the user can improve the accuracy in detecting a target subject, or can take measures against the fact that a fake is on the market.

On the other hand, when a negative result has been obtained by the determination processing performed in Step S620, the cloud server 3A skips the process of Step S621, and terminates the series of processes illustrated in FIG. 29.

Note that the example of applying the information processing system 100A to the case in which the image-capturing apparatus 1 includes the determination section 86, as in the first example, has been described above as an example of applying the information processing system 100A. However, such a configuration of the information processing system 100A in which an anomaly-detection determination is performed with respect to a target subject can also be applied to the case in which the fog server 2 includes the determination section 86, as in the second example (FIGS. 24 and 25) described above.

6. Conclusion Regarding Embodiments

As described above, an information processing system (the information processing system 100, 100' or 100A) of the embodiments is an information processing system that includes an image-capturing apparatus (the image-capturing apparatus 1) and an information processing apparatus (the fog server 2, or the cloud server 3 or 3A, or the user terminal 4), and the image-capturing apparatus includes an image-capturing section (for example, the array sensor 12) that is used to obtain a captured image of a subject, and a feature detector (the feature detector 85) that detects, on the basis of the captured image, feature information that is information indicating a feature of the subject.

Further, the image-capturing apparatus or the information processing apparatus includes a determination section (the determination section 86) that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.

When the image-capturing apparatus includes a function of detecting a feature of a subject, as described above, this results in there being no need to transmit a captured image to the information processing apparatus in order to determine whether there exists a target subject.

This makes it possible to reduce a volume of communication data necessary for determination performed by a system that determines whether there exists a target subject, on the basis of a captured image.

Further, in the information processing system according to the embodiments, the image-capturing section includes an array sensor (the array sensor 12) that includes a plurality of one-dimensionally or two-dimensionally arranged pixels each including a light-receiving element that receives visible light or non-visible light, and the feature detector is placed in one package with the array sensor (refer to FIG. 12).

Image processing for detecting a feature of a subject can be performed in one package with the array sensor, and this makes it possible to reduce the possibility that a content of image will leak out, compared to when the image processing is performed outside of the sensor package.

This makes it possible to enhance the security.

Further, in the information processing system according to the embodiments, the image-capturing apparatus includes a determination section.

This results in the processing load imposed to determine whether there exists a target subject being distributed to the respective image-capturing apparatuses, and results in there being no need for the information processing apparatus to perform processing of the determination.

This makes it possible to reduce the processing load of the information processing apparatus. Further, there is no need for transmission of feature information from the image-capturing apparatus to the information processing apparatus, and this makes it possible to reduce a volume of communication data.

Furthermore, in the information processing system according to the embodiments, the information processing apparatus includes a determination section.

This results in there being no need for the image-capturing apparatus to perform processing of determining whether there exists a target subject.

This results in a reduction in the processing load of the image-capturing apparatus. This makes it possible to scale down a circuit of the image-capturing apparatus and to make the circuit smaller in size. Such a configuration is suitable when there is a need to make the image-capturing apparatus smaller for the purpose of applying the image-capturing apparatus to, for example, a surveillance camera.

Further, in the information processing system according to the embodiments, the image-capturing apparatus includes an encryption section that encrypts a captured image, and an image transmission section that performs processing of transmitting the captured image encrypted by the encryption section to the information processing apparatus.

It is conceivable that an image captured when a target subject has appeared could be transmitted to the information processing apparatus upon the appearance of the target subject. The adoption of the configuration in which an encrypted captured image is transmitted to the information processing apparatus makes it possible to prevent a content of image from leaking out upon transmitting an image captured when a target subject has appeared to the information processing apparatus.

This makes it possible to enhance the security. Further, in the information processing system according to the embodiments, the image-capturing section includes an array sensor (the array sensor 12) that includes a plurality of one-dimensionally or two-dimensionally arranged pixels each including a light-receiving element that receives visible light or non-visible light, and the encryption section encrypts a captured image on the basis of photoelectric random numbers that are random numbers obtained on the basis of a photoelectric conversion performed by the array sensor.

This results in encryption that makes it more difficult to achieve decryption, compared to when pseudorandom numbers are used.

This makes it possible to enhance the security.

Furthermore, in the information processing system according to the embodiments, the encryption section encrypts a signal read from the array sensor from a pixel.

The encryption of a signal read from a pixel results in preventing a captured-image signal from being stored in a memory in the form of a plaintext.

This makes it possible to enhance the security.

Further, in the information processing system according to the embodiments, the image-capturing apparatus includes a feature transmission section (the controller 23) that performs processing of transmitting feature information detected by the feature detector to the information processing apparatus (refer to FIG. 21).

This makes it possible to cause the information processing apparatus to acquire information that indicates a feature of a subject in a captured image.

This results in there being no need for the information processing apparatus to perform processing of detecting feature information regarding a subject on the basis of a captured image when the information processing apparatus is caused to acquire the feature information. In other words, there is no need for transmission of a captured image to the information processing apparatus, and this makes it possible to reduce a volume of communication data. Further, even when there is a need to cause the information processing apparatus to acquire feature information regarding a subject and a captured image, the image-capturing apparatus is allowed to encrypt the captured image and transmit the encrypted captured image, since there is no need for the information processing apparatus to perform processing of detecting the feature information on the basis of the captured image. This makes it possible to enhance the security.

Further, in the information processing system according to the embodiments, the feature detector detects feature information for each feature with a different degree of abstraction of a subject.

Examples of the features with different degrees of abstraction when the subject is a person include a feature with a high degree of abstraction such as height and gender; and a feature with a low degree of abstraction (that is, a more specific feature) such as a color of the clothes and a color of hair. Further, the examples of the features with different degrees of abstraction when the subject is a vehicle include a feature with a high degree of abstraction such as a color of a vehicle, and a vehicle type such as a standard-sized vehicle or a large-sized vehicle; and a feature with a low degree of abstraction such as a specific vehicle model and a specific number in a license plate. For example, depending on an application that uses feature information, there may be no need for information regarding a feature with a low degree of abstraction, but there may be a need for information regarding a feature with a high degree of abstraction only. When feature information is detected for each feature with a different degree of abstraction, as described above, this makes it possible to only select and output information regarding a feature with a specific degree of abstraction from among detected feature information, or to output all of detected feature information regardless of the degree of abstraction.

This makes it possible to increase a degree of freedom in selecting output-target feature information.

For example, when only information regarding a feature with a necessary degree of abstraction is selected and output, this makes it possible to reduce a volume of data necessary to communicate feature information.

Further, when feature information is detected for each feature with a different degree of abstraction, this also makes it possible to perform processing of determining a target subject for each piece of information regarding a feature with a different degree of abstraction. Specifically, for example, it is possible to perform first determination processing on the basis of information regarding a feature with a high degree of abstraction such as height and gender to narrow down the subject; and then to perform second determination processing on the basis of information regarding a feature with a low degree of abstraction such as a color of the clothes and a color of hair to obtain a final determination result.

Furthermore, the information processing system according to the embodiments includes a plurality of image-capturing apparatuses.

This makes it possible to determine whether there exists a target subject on the basis of captured images from a plurality of viewpoints.

This results in being able to make a range for searching for a target subject larger.

Further, the information processing system according to the embodiments includes a notification processing section (the first notification processing section 51 and the second notification processing section 52) that performs processing of outputting notification information in response to the determination section determining that there exists a target subject.

This makes it possible to notify a user of the appearance of a target subject.

This results in there being no need for the user to inquire of the system about everything in order to know the appearance of a target subject. This makes it possible to reduce the burden on a user.

Furthermore, an information processing system (the information processing system 100A) according to the embodiments includes a plurality of image-capturing apparatuses, and an information processing apparatus (the cloud server 3A or the fog server 2) includes an anomaly-detection determination section (the anomaly-detection determination section 55) that determines, on the basis of a result of determination performed by the determination section, whether the target subject has been detected in captured images at respective timings that are not physically probable, the captured images being captured by the image-capturing apparatuses being different from each other.

"Being detected at a timing that is not physically probable" refers to a state in which, when a target subject has been detected in images respectively captured by two image-capturing apparatuses, a time difference in target-subject detection between the two image-capturing apparatuses is smaller than a shortest time necessary for an object corresponding to the target subject to move between locations at which the two image-capturing apparatuses are respectively placed. When a target subject has been detected by different image-capturing apparatuses at respective timings that are not physically probable, it can be estimated that there is a problem with the accuracy in detecting a target subject, or it can be estimated that an anomaly due to an algorithm used to detect a target subject, or an anomaly due to an object corresponding to a target subject has occurred, such as a state in which a counterfeit of an object corresponding to a target subject has been coming onto the market.

Thus, the configuration describe above makes it possible to appropriately determine whether an anomaly due to the accuracy in detecting a target subject, or an anomaly due to an object corresponding to a target subject has occurred.

Further, an information processing method according to the embodiments is an information processing method that is performed by an information processing system that includes an image-capturing apparatus and an information processing apparatus, the information processing method including detecting, by the image-capturing apparatus, feature information that is information indicating a feature of a subject, on the basis of a captured image of the subject; and determining, by the image-capturing apparatus or the information processing apparatus, whether there exists a target subject in the captured image on the basis of detected feature information that is the feature information obtained by the detection, and on the basis of target feature information that is the feature information to be targeted, the target subject being a subject for which the detected feature information matches or is similar to the target feature information.

Such an information processing method also makes it possible to provide effects similar to those provided by the information processing system according to the embodiments described above.

Further, an image-capturing apparatus (the image-capturing apparatus 1) according to the embodiments includes an image-capturing section that is used to obtain a captured image of a subject; a feature detector that detects, on the basis of the captured image, feature information that is information indicating a feature of the subject; and a determination section that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.

Furthermore, an information processing apparatus (the fog server 2, the cloud server 3, or the user terminal 4) according the embodiments includes a determination section that acquires detected feature information from an image-capturing apparatus that includes an image-capturing section that is used to obtain a captured image of a subject, and a feature detector that detects, on the basis of the captured image, feature information that is information indicating a feature of the subject, the detected feature information being the feature information detected by the feature detector, the determination section determining whether there exists a target subject in the captured image on the basis of the acquired detected feature information, and on the basis of target feature information that is the feature information to be targeted, the target subject being a subject for which the detected feature information matches or is similar to the target feature information.

The image-capturing apparatus and the information processing apparatus also make it possible to provide effects similar to those provided by the information processing system according to the embodiments described above.

Note that the effects described herein are not limitative but are merely illustrative, and other effects may be provided.

Here, the present technology can be applied to a technology that is the so-called Internet of things (IoT). The IoT is a mechanism in which an IoT device that corresponds to a "thing" is connected to, for example, another IoT device, the Internet, a cloud, or a fog, and exchanges information with the connection counterpart so that the IoT device and the connection counterpart perform a mutual control. The IoT can be used in various industries such as industries of agriculture, housing, automobile, production, distribution, and energy.

7. Present Technology

The present technology may also take the following configurations.
(1) An information processing system, including:
   an image-capturing apparatus; and
   an information processing apparatus,
   the image-capturing apparatus including
      an image-capturing section that is used to obtain a captured image of a subject, and
      a feature detector that detects, on the basis of the captured image, feature information that is information indicating a feature of the subject,
   the image-capturing apparatus or the information processing apparatus including a determination section that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.
(2) The information processing system according to (1), in which
   the image-capturing section includes an array sensor that includes a plurality of one-dimensionally or two-dimensionally arranged pixels each including a light-receiving element that receives visible light or non-visible light, and
   the feature detector is placed in one package with the array sensor.
(3) The information processing system according to (1) or (2), in which
   the image-capturing apparatus includes the determination section.
(4) The information processing system according to (1) or (2), in which
   the information processing apparatus includes the determination section.
(5) The information processing system according to any one of (1) to (4), in which
   the image-capturing apparatus includes
      an encryption section that encrypts the captured image, and
      an image transmission section that performs processing of transmitting the captured image encrypted by the encryption section to the information processing apparatus.
(6) The information processing system according to (5), in which
   the image-capturing section includes an array sensor that includes a plurality of one-dimensionally or two-dimensionally arranged pixels each including a light-receiving element that receives visible light or non-visible light, and
   the encryption section encrypts the captured image on the basis of photoelectric random numbers that are random numbers obtained on the basis of a photoelectric conversion performed by the array sensor.
(7) The information processing system according to (6), in which
   the encryption section performs the encryption with respect to a signal read from the pixel in the array sensor.
(8) The information processing system according to any one of (1) to (7), in which
   the image-capturing apparatus includes a feature transmission section that performs processing of transmitting the feature information detected by the feature detector to the information processing apparatus.
(9) The information processing system according to any one of (1) to (8), in which
   the feature detector detects the feature information for each feature with a different degree of abstraction of the subject.
(10) The information processing system according to any one of (1) to (9), in which
   the information processing system includes a plurality of the image-capturing apparatuses.
(11) The information processing system according to any one of (1) to (10), further including
   a notification processing section that performs processing of outputting notification information in response to the determination section determining that there exists the target subject.
(12) The information processing system according to any one of (1) to (11), in which
   the information processing system includes a plurality of the image-capturing apparatuses, and
   the information processing apparatus includes an anomaly-detection determination section that determines, on the basis of a result of the determination performed by the determination section, whether the target subject has been detected in captured images at respective timings that are not physically probable, the captured images being captured by the image-capturing apparatuses being different from each other.
(13) An information processing method that is performed by an information processing system that includes an image-capturing apparatus and an information processing apparatus, the information processing method including:
   detecting, by the image-capturing apparatus, feature information that is information indicating a feature of a subject, on the basis of a captured image of the subject; and
   determining, by the image-capturing apparatus or the information processing apparatus, whether there exists a target subject in the captured image on the basis of detected feature information that is the feature information obtained by the detection, and on the basis of target feature information that is the feature information to be targeted, the target subject being a subject for which the detected feature information matches or is similar to the target feature information.
(14) An image-capturing apparatus, including:
   an image-capturing section that is used to obtain a captured image of a subject;
   a feature detector that detects, on the basis of the captured image, feature information that is information indicating a feature of the subject; and
   a determination section that determines whether there exists a target subject in the captured image on the basis of detected feature information that is the feature information detected by the feature detector, and on the basis of target feature information that is the feature information to be targeted, the target subject being a subject for which the detected feature information matches or is similar to the target feature information.

(15) An information processing apparatus, including
a determination section that acquires detected feature information from an image-capturing apparatus that includes an image-capturing section that is used to obtain a captured image of a subject, and a feature detector that detects, on the basis of the captured image, feature information that is information indicating a feature of the subject, the detected feature information being the feature information detected by the feature detector, the determination section determining whether there exists a target subject in the captured image on the basis of the acquired detected feature information, and on the basis of target feature information that is the feature information to be targeted, the target subject being a subject for which the detected feature information matches or is similar to the target feature information.

REFERENCE SIGNS LIST 100, 100', 100A information processing system
1 image-capturing apparatus
2 fog server
3, 3A cloud server
4 user terminal
10 image-capturing sensor section
12 array sensor
18 computing section
19, 19A amplitude control circuit
82 object region recognizing section
83 class identification section
84 encryption controller
85 feature detector
86 determination section
23 controller
25 communication section
31 CPU
32 ROM
33 RAM
34 bus
35 input/output interface
36 input section
37 output section
38 storage
39 communication section
50 target feature information transmitting section
51 first notification processing section
52 second notification processing section
53 feature information transmitting section
54 target feature information acquiring section
55 anomaly-detection determination section

The invention claimed is:
1. An information processing system, comprising:
an image-capturing apparatus; and
an information processing apparatus,
the image-capturing apparatus including
an array sensor configured to obtain a captured image of a subject, the array sensor including a plurality of one-dimensionally or two-dimensionally arranged pixels each including a light-receiving element that receives visible light or non-visible light, and circuitry configured to
detect a feature of the subject and generate feature information that indicates the feature of the subject, and
determine whether there exists a target subject in the captured image on the basis of the feature information and target feature information that indicate a target feature of the target subject, the target subject being determined to exist under a condition that the feature information matches or is similar to the target feature information, wherein the circuitry is further configured to
sequentially encrypt the captured image of the subject and generate an encrypted image of the subject, and
transmit the encrypted image of the subject to the information processing apparatus,
sequentially decrypt the encrypted image of the subject and generate a decrypted image of the subject, and
detect the feature of the subject on the basis of the decrypted image of the subject.

2. The information processing system according to claim 1, wherein
the circuitry is placed in one package with the array sensor.

3. The information processing system according to claim 1, wherein
the circuitry is further configured to encrypt the captured image on the basis of photoelectric random numbers that are random numbers obtained on the basis of a photoelectric conversion performed by the array sensor.

4. The information processing system according to claim 3, wherein
the circuitry is further configured to encrypt the captured image of the subject with respect to signals read from the pixels in the array sensor.

5. The information processing system according to claim 1, wherein
the circuitry is further configured to transmit the feature information to the information processing apparatus.

6. The information processing system according to claim 1, wherein
the circuitry is further configured to detect the feature of the subject for each aspect of the feature with a different degree of abstraction of the subject.

7. The information processing system according to claim 1, wherein
the information processing system comprises a plurality of image-capturing apparatuses that include the image-capturing apparatus.

8. The information processing system according to claim 1,
wherein the circuitry is further configured to output notification information in response to determination that there exists the target subject in the captured image.

9. The information processing system according to claim 1, wherein
the information processing system comprises a plurality of image-capturing apparatuses that include the image-capturing apparatus, and
the information processing apparatus includes circuitry configured to determine, on the basis of a result of determination that the target subject exists in the captured image performed by each of the plurality of image-capturing apparatuses, whether the target subject has been detected in captured images at respective timings that are not physically probable, the captured images being captured by the plurality of image-capturing apparatuses.

10. An information processing method that is performed by an image-capturing apparatus the information processing method comprising:
   obtaining a captured image of a subject:
   detecting a feature of the subject;
   generating feature information that indicates the feature of the subject;
   determining whether there exists a target subject in the captured image on the basis of the feature information and target feature information that indicates a target feature of the target subject, the target subject being determined to exist under a condition that the feature information matches or is similar to the target feature information;
   sequentially encrypting the captured image of the subject and generating an encrypted image of the subject;
   sequentially decrypting the encrypted image of the subject and generating a decrypted image of the subject; and
   detecting the feature of the subject on the basis of the decrypted image of the subject.

11. An image-capturing apparatus, comprising:
   an array sensor configured to obtain a captured image of a subject, the array sensor including a plurality of one-dimensionally or two-dimensionally arranged pixels each including a light-receiving element that receives visible light or non-visible light; and
   circuitry configured to
   detect a feature of the subject and generate feature information that indicates the feature of the subject; and
   determine whether there exists a target subject in the captured image on the basis of the feature information and target feature information that indicates a target feature of the target subject, the target subject being determined to exist under a condition that the feature information matches or is similar to the target feature information, wherein
   the circuitry is further configured to
   sequentially encrypt the captured image of the subject and generate an encrypted image of the subject,
   sequentially decrypt the encrypted image of the subject and generate a decrypted image of the subject, and
   detect the feature of the subject on the basis of the decrypted image of the subject.

12. The image-capturing apparatus according to claim 11, wherein
   the circuitry is further configured to encrypt the captured image of the subject with respect to signals read from the pixels in the array sensor.

13. The image-capturing apparatus according to claim 11, wherein
   the circuitry is further configured to detect the feature of the subject for each aspect of the feature with a different degree of abstraction of the subject.

* * * * *